United States Patent [19]

Asano et al.

[11] Patent Number: 4,722,042

[45] Date of Patent: Jan. 26, 1988

[54] METHOD OF CONTROLLING CURRENT OF INVERTER FOR OPTIMUM SETTING OF SWITCHING MODES

[75] Inventors: Katsuhiro Asano, Nagoya; Norio Iwama, Aichi, both of Japan

[73] Assignee: Kabushiki Kaisha Toyota Chuo Kenkyusho, Aichi, Japan

[21] Appl. No.: 915,051

[22] Filed: Oct. 3, 1986

[30] Foreign Application Priority Data

Oct. 7, 1985 [JP] Japan .................. 60-223182

[51] Int. Cl.⁴ .................................... H02M 7/44
[52] U.S. Cl. ........................................ 363/98; 363/96; 318/802
[58] Field of Search .................. 363/17, 98, 132, 136, 363/137; 318/801, 802

[56] References Cited

U.S. PATENT DOCUMENTS 4,447,787  5/1984  Schwesig et al. ............... 318/803
4,488,215  12/1984  Pfaff et al. ........................ 363/159
4,503,376  3/1985  Okuyama .......................... 318/802

Primary Examiner—Patrick R. Salce
Assistant Examiner—Marc S. Hoff
Attorney, Agent, or Firm—Parkhurst & Oliff

[57] ABSTRACT

A method of controlling current of a multi-phase inverter is based on the principle that, when an appropriate switching mode is set, the direction of change of the position of the end of the current deviation vector must converge within a specific range which is determined in accordance with a presently output voltage vector. Accordingly, the direction of change of the position of the end of the current deviation vector and a presently set switching mode are detected during each control period to make a judgement as to whether or not the detected current deviation change direction belongs to a predetermined reference change direction range. When the answer of this judgement is affirmative, the presently set switching mode is found to be appropriate; therefore, this switching mode is maintained, whereas, when the answer of the judgement is negative, the switching mode is changed to a switching mode which has a reference change direction range to which the detected current deviation change direction belongs and which is determined in accordance with the presently output voltage vector. Thus, an appropriate switching mode is continued or newly set, and a voltage vector is selected from among voltage vectors which are allowed to be selected in this set switching mode, said voltage vector being capable of converging the current deviations within a predetermined range including the origin on the complex plane, and the selected voltage vector is employed as a voltage vector for the next control period.

20 Claims, 38 Drawing Figures

METHOD OF CONTROLLING CURRENT OF INVERTER FOR OPTIMUM SETTING OF SWITCHING MODES

BACKGROUND OF THE INVENTION

1. Field of the Invention

The present invention relates to a method of controlling current of an inverter or a multiphase inverter. More particularly, the present invention pertains to a method of controlling current of a current-controlled inverter in which, when an inductive load is controlled by pulse-width modulation, output currents of the inverter are detected, and control is effected so that instantaneous values of the output currents are substantially equal to set output current command values, respectively.

2. Description of the Related Art

Referring first to FIG. 28, which shows one type of conventional current-controlled inverter, an inverter 1 is a three-phase voltage type inverter which has a relatively small impedance when viewing the power supply side from the load. The inverter 1 is able to apply to a load 5 a total of eight kinds of voltage vector $V_k$ $(k=0, 1, 2, \ldots, 7)$ as shown in Table 1 and FIG. 29 in accordance with the combination of ON/OFF states of switching elements defined by transistors $T_{ra}+$, $T_{ra}-$, $T_{rb}+$, $T_{rb}-$, $T_{rc}+$ and $T_{rc}-$, that is, the combination of output potentials of the three phases of the inverter 1.

A current control circuit 3 is supplied with an instantaneous value i of the output current of each phase which is detected by current detectors 15 and 16 respectively provided on output lines of the inverter 1, and an output current command value i* for each phase which is output from an output current command value calculating circuit 4. In the current control circuit 3, a deviation $\Delta i$ ($\Delta i_a$, $\Delta i_b$ and $\Delta i_c$) of the input instantaneous value i ($i_a$, $i_b$ and $i_c$) of the output current of each phase from the input command value i* ($i_a^*$, $i_b^*$ and $i_c^*$) is obtained by means of each of the adders 6, 7 and 8, and the obtained deviation $\Delta i$ is compared with a reference value by each of the hysteresis comparators 9, 10 and 11, thereby determining an output potential command for each of the phases a, b and c. The output potential commands thus determined are output to the corresponding transistors through a driver circuit 2. More specifically, output potential commands which are not inverted are employed as ON/OFF commands for the transistors $T_{ra}+$, $T_{rb}+$ and $T_{rc}+$, and output potential commands which are inverted by NOT circuits 12, 13 and 14 are employed as ON/OFF commands for the transistors $T_{ra}-$, $T_{rb}-$ and $T_{rc}-$.

TABLE 1

| Voltage vectors | Output potentials | | | ON/OFF states of transistors | | | | | |
|---|---|---|---|---|---|---|---|---|---|
| | a-phase | b-ph. | c-ph. | $T_{ra}+$ | $T_{ra}-$ | $T_{rb}+$ | $T_{rb}-$ | $T_{rc}+$ | $T_{rc}-$ |
| $V_0$ | − | − | − | OFF | ON | OFF | ON | OFF | ON |
| $V_1$ | + | − | − | ON | OFF | OFF | ON | OFF | ON |
| $V_2$ | + | + | − | ON | OFF | ON | OFF | OFF | ON |
| $V_3$ | − | + | − | OFF | ON | ON | OFF | OFF | ON |
| $V_4$ | − | + | + | OFF | ON | ON | OFF | ON | OFF |
| $V_5$ | − | − | + | OFF | ON | OFF | ON | ON | OFF |
| $V_6$ | + | − | + | ON | OFF | OFF | ON | ON | OFF |
| $V_7$ | + | + | + | ON | OFF | ON | OFF | ON | OFF |

It should be noted that the adder 17 obtains a detected output current value of the c-phase from detected output current values of the a- and b-phases.

The conventional current control method, which is carried out by a control apparatus such as that shown in FIG. 28, employs ever-changing instantaneous values of output currents as data on the basis of which output potentials are switched to optimal ones, which means that the response is improved in contrast to mean value current control methods such as one which employs triangular-wave comparison technique.

The above-described conventional method suffers, however, from the following disadvantage. Since an output potential is independently determined for each phase, the eight kinds of voltage vectors $V_k$ shown in FIG. 29 are selected at random, and this leads to various problems, such as increases in both switching frequency and losses, lowering in the degree of accuracy in current control, and an increase in the noise level.

In order to overcome such a disadvantage, a limited instantaneous value current control method (i.e., "Harmonic Suppressing High-Response Current-Controlled PWM Inverter Control Method", National Meeting of Electrical Engineering Society 490, 1985) has been studied in which control is effected so that an optimal voltage vector alone is selected. FIG. 30 is a block diagram of a current control apparatus which employs this method.

Referring to FIG. 30, a target voltage phase calculating circuit 20 calculates a target voltage value $e_0$ which is represented by the following formula (1), and outputs the resultant phase angle $\theta^*$ to a voltage vector selecting circuit 18.

$$e_0 = L \frac{di^*}{dt} + Ri + e \qquad (1)$$

i*: output current command value
i: detected output current value
L: inductance of load
R: resistance of load
e: internally induced electromotive force An output current command value calculating circuit 4 calculates and outputs an output current command value i* of each phase to each of the adders 6, 7 and 8. Each adder calculates a current deviation $\Delta i$ ($\Delta i_a$, $\Delta i_b$ and $\Delta i_c$) of each phase from an output current command value i* and a detected output current value i of each phase which are input thereto, and outputs the result of calculation to a current deviation quantizing circuit 19. The circuit 19 makes a comparison between the input current deviation $\Delta i$ of each phase and a preset threshold value, quantizes the current deviation $\Delta i$ on the basis of the the result of comparison, and outputs the quantized current deviation to the voltage vector selecting circuit 18. The circuit 18 is supplied with the phase angle $\theta^*$ of a target voltage value from the target voltage phase calculating circuit 20, the quantized current deviation from the current deviation quantizing circuit 19, and data concerning the number of times of switching which is fed back from the circuit 18 itself. On the basis of these data items, the circuit 18 calculates and outputs a voltage vector $V_k$ to be selected and data concerning the number of times of switching.

The method of selecting a voltage vector $V_k$ in the voltage vector selecting circuit 18 will be explained below with reference to FIGS. 31, 32 and 33, together with Table 2.

First, a complex plane is divided into six regions (A, B, ..., F) every 60° by the winding axes of the three phases. Then, a region in which a target voltage value is present is recognized by obtaining the phase angle of the target voltage value, and one of the switching modes (A, B, ..., F) as shown in Table 2 is determined on the basis of the recognized region.

TABLE 2

| Switching modes | Voltage vectors which can be selected |
|---|---|
| A | $V_1, V_2, V_0, V_7$ |
| B | $V_2, V_3, V_0, V_7$ |
| C | $V_3, V_4, V_0, V_7$ |
| D | $V_4, V_5, V_0, V_7$ |
| E | $V_5, V_6, V_0, V_7$ |
| F | $V_6, V_1, V_0, V_7$ |

The current deviation quantizing circuit 19 makes a comparison between the current deviations $\Delta i_a$, $\Delta i_b$ and $\Delta i_c$ and a total of 15 threshold values $S_{a1}$ to $S_{a5}$, $S_{b1}$ to $S_{b5}$, and $S_{c1}$ to $S_{c5}$ (five values for each phase), such as those shown in FIG. 32 to detect a region in which the respective current deviation of the three phases are mutually present. The circuit 19 then quantizes the current deviations on the basis of the result of the comparison, and outputs the quantized current deviations to the voltage vector selecting circuit 18. When, for example, the quantized current deviations are present outside the outer hexagon in FIG. 32, the voltage vector selecting circuit 18 unconditionally selects the voltage vectors $V_1$ to $V_6$ with which the current deviations $\Delta i$ are decreased most quickly, the voltage vectors $V_1$ to $V_6$ being set in correspondence with various regions, respectively, shown in FIG. 32. For example, when the region which is surrounded by the threshold values $S_{a1}$, $S_{b3}$ and $S_{c3}$ is a quantizing region, the component of current deviation in the direction of the voltage vector $V_1$ is the largest. Therefore, the voltage vector $V_1$ is selected so that the component of current deviation in the direction of the vector $V_1$ is decreased.

When the quantized current deviations are present inside the outer hexagon, a voltage vector $V_k$ is selected in accordance with a switching mode determined from FIG. 31 and the quantized current deviations.

When, for example, the switching mode is A, the voltage vector selecting circuit 18 selects one of the voltage vectors $V_1$, $V_2$, $V_0$ and $V_7$ in accordance with the quantized current deviations, the voltage vectors $V_1$, $V_2$, $V_0$ and $V_7$ being set in correspondence with various regions, respectively, as shown in FIG. 33. It should be noted that the inside of the inner hexagon shown in FIG. 33 involves the smallest deviation for each phase; therefore, when the quantized current deviations are present inside the inner hexagon, the voltage vector which is presently selected is not changed. In a region shown in FIG. 33 in which two voltage vectors $V_0$ and $V_7$ are set, either one of the voltage vectors is selected which involves a smaller number of times of switching needed when a voltage vector is changed. The judgement as to the number of times of switching is made on the basis of data concerning the number of times of switching which is fed back to the voltage vector selecting circuit 18 directly from the output thereof, said data representing the number of times of switching needed when either $V_0$ or $V_7$ (in the case of the above-described example) is selected.

The conventional instantaneous value current control method, employing the current control apparatus shown in FIG. 30, enables an optimal voltage vector alone to be selected on the basis of the phase angle of a particular target voltage value.

However, the arrangement shown in FIG. 30 necessitates the selection of switching modes shown in FIG. 31 to be appropriately effected on the basis of the phase angle of a particular target voltage value. Therefore, if any error in the calculation or detection of the phase angle of a particular target voltage value causes the voltage vector selecting circuit 18 to erroneously recognize the mode F when the mode A should be selected, the following problem arises. Namely, whichever voltage vector is selected from among $V_6$, $V_1$, $V_0$ and $V_7$, the direction of change of the current deviations is in the left-hand half of the complex plane from the origin 0 used as the starting point as shown in FIG. 34: that is, the range $r_4$ for $V_0$ and $V_7$; the range $r_5$ for $V_6$; and the range $r_6$ for $V_1$. Accordingly, in this state, the current deviations diverge from the origin 0 to the left-hand half of the complex plane, and it is impossible to control the output currents so that they are substantially equal to the command values, respectively, by using the voltage vectors $V_6$, $V_1$, $V_0$ or $V_7$ alone.

In other words, it is necessary to accurately effect calculation and detection of the phase angle of each target voltage.

However, in order to accurately obtain the target voltage value $e_0$ shown in the above-described formula (1) even during a transient state, it is necessary to employ an ideal sensor which is capable of detecting i and e at high speed and with high accuracy, which means that it is difficult to effect such detection in practice. In addition, since the impedance L and resistance R of the load change momentarily in accordance with temperature or other environmental factors, it is also difficult to correct them.

A delay in processing which is executed to obtain a target voltage value $e_0$ also constitutes an error which cannot be ignored, because current deviations change at high speed.

Thus, the above-described instantaneous value current control method inevitably involves a condition in which an inappropriate switching mode is set, which means that it is difficult to effect current control by means of an optimal voltage vector alone, and this leads to various problems such as increases in the switching frequency and losses in relation to the inverter, lowering in the degree of accuracy in current control, and an increase in the noise level.

In addition, the conventional method, employing the arrangement shown in FIG. 30, may need commutation for two phases when one voltage vector is changed to another even when an appropriate switching mode is set.

For example, if the current deviations enter a region indicated by $V_2$ in FIG. 33 when the switching mode is A and the selected voltage vector is $V_0$, it is necessary to change the voltage vector from $V_0$ to $V_2$, that is, it is necessary to effect commutation for the A- and B-phases at the same time as will be understood from Table 1.

If the current deviations enter the region indicated by $V_1$ in FIG. 33 when the switching mode is A and the selected voltage vector is $V_7$, it is also necessary to change the voltage vector from $V_7$ to $V_1$, that is, it is necessary to effect commutation for the B- and C-phases at the same time.

On the other hand, if exchange between the voltage vectors alone is made as shown in the following formula (2), it must be possible to change one voltage vector to another simply by effecting commutation for only one phase $$V_0 \rightleftarrows V_1 \rightleftarrows V_2 \rightleftarrows V_7 \text{ (during the mode A)} \quad (2)$$

Thus, the conventional method shown in FIG. 30 needs a larger number of times of commutation than that in the case of the voltage vector exchange method shown by the formula (2). For this reason, the conventional method involves the problems of increases in the switching frequency, the loss and the noise level.

The conventional method further has the following problem. When the quantized current deviations are present outside the outer hexagon in FIG. 32, oscillation occurs on any one of the threshold values $S_{a3}$, $S_{b3}$ and $S_{c3}$. For example, when the current deviations are present outside the outer hexagon and in an area within the region of $V_1$ which is in the vicinity of the threshold value $S_{b3}$, the current deviations immediately move to the region of $V_2$, and when the current deviations enter the region of $V_2$, they move back to the region of $V_1$ immediately. In other words, oscillation occurs with a period which is defined by the dead time that is required when voltage vectors are changed from one to another.

SUMMARY OF THE INVENTION

In view of the above-described circumstances, it is a primary object of the present invention to provide a method of controlling current of an inverter or a multiphase inverter which enables a switching mode to be set appropriately at all times in a real-time manner, and permits voltage vectors to be changed from one to another simply by effecting commutation for only one phase, thereby eliminating the fear of oscillation occurring on any occasion, and allowing decreases in the switching frequency, losses and noise level in relation to the inverter or multiphase inverter and an increase in the degree of accuracy in current control.

To this end, the present invention provides a method of controlling current of an inverter in which switching elements of the inverter are ON/OFF controlled so that instantaneous values of output currents of the inverter are coincident with output current command values, respectively, the method comprising the steps of: dividing all voltage vectors determined in accordance with the combination of ON/OFF states of the switching elements of various phases into a plurality of voltage vector groups each including a voltage vector of magnitude zero and a plurality of voltage vectors the directions of which are within 180° with respect to each other, and setting switching modes in correspondence with the voltage vector groups, respectively, each switching mode allowing selection of the voltage vectors within the corresponding group when it is set; obtaining current deviations of detected output current values from their respective output current command values, and detecting a direction of change of the position of the end of the current deviation vector on a complex plane; making a judgement as to whether or not the detected direction of change belongs to a reference change direction range which is determined by both a presently output voltage vector and one of the switching modes which is presently set; maintaining the presently set switching mode when the answer of the judgement is affirmative, but changing the presently set switching mode to a switching mode involving a reference change direction range to which the detected change direction belongs and which is determined by the presently selected voltage vector when the answer of the judgement is negative; and selecting a voltage vector from the voltage vectors which are allowed to be selected in the switching mode which is maintained or newly set, said voltage vector being capable of reverging the current deviations within a predetermined range including the origin on the complex plane.

More specifically, the present invention is based on the principle that, when an appropriate switching mode is set, the direction of change of the position of the end of the current deviation vector (hereinafter referred to as simply "the current deviation change direction") must converge within a specific range which is determined in accordance with a present set switching mode and a presently selected voltage vector.

According to the above-described method of the present invention, the current deviation change direction is detected during each control period to make a judgement as to whether or not the detected current deviation change direction belongs to a range of reference directions of change, and when the answer of this judgement is affirmative, the presently set switching mode is found to be appropriate; therefore, the presently set switching mode is maintained, whereas, when the answer of the judgement is negative, the switching mode is changed to a switching mode having a reference change direction range to which the detected change direction belongs and which is determined in accordance with the presently selected voltage vector. Thus, an appropriate switching mode is maintained or newly set, and a voltage vector is selected from among voltage vectors which are allowed to be selected in this set switching mode, said voltage vector being capable of converging the current deviations within a predetermined range including the origin of the complex plane, and the selected voltage vector is employed as a voltage vector during the next control period.

BRIEF DESCRIPTION OF THE DRAWINGS

The above and other objects, features and advantages of the present invention will become more apparent from the following description of the preferred embodiments thereof, taken in conjunctions with the accompanying drawings, in which.

DESCRIPTION OF THE PREFERRED EMBODIMENTS

The present invention will be described hereinunder in detail with reference to the accompanying drawings.

The basic concept of the present invention will first be explained with reference to FIG. 1 which is a block diagram of a current control apparatus to which the present invention is applied.

Figure 1:
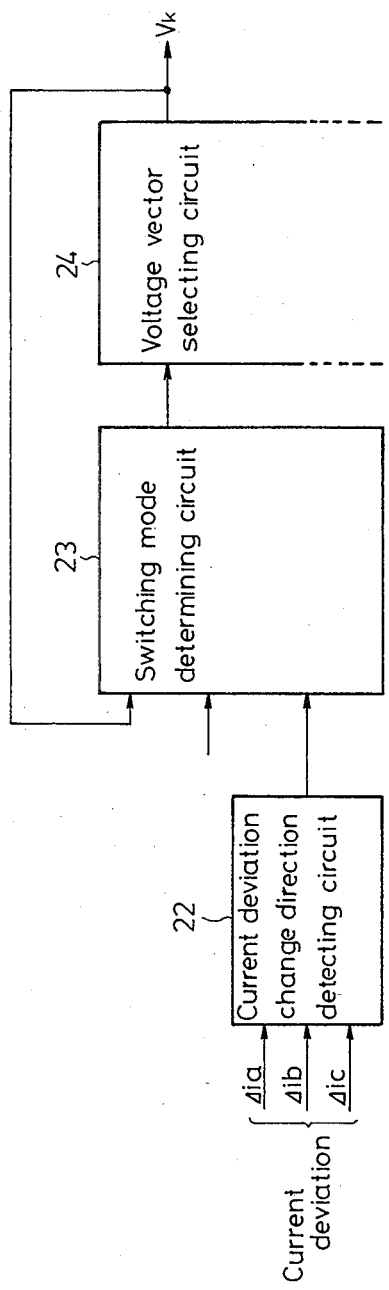
FIG. 1 is a block diagram showing a basic conceptional arrangement according to the present invention.

Referring to FIG. 1, a current deviation change direction detecting circuit 22 is adapted to detect a current deviation change direction, i.e., a direction of change of the position of the end of the current deviation vector on the basis of deviations $\Delta i$ of detected instantaneous values $i$ of output currents from the corresponding output current command values $i^*$ of various phases. A symbol of the current deviation vector is omitted from the specification and drawings of this application. A switching mode determining circuit 23 is adapted to determine an optimal switching mode by making a judgement through comparison between the detected current deviation change direction and a range of reference current deviation change directions which is determined by a presently selected voltage vector $V_k$ and a presently set switching mode. The switching mode determining circuit 23 has a table stored therein as a function of a presently selected voltage vector, a presently set switching mode and a current deviation change direction, the table being formed, as shown in Table 2, by dividing all voltage vectors determined in accordance with the combination of ON/OFF states of switching elements of the various phases of the inverter into a plurality of voltage vector groups each including zero vectors and a plurality of voltage vectors the directions of which are within 180° with respect to each other, and setting a plurality of switching modes in correspondence with the voltage vector groups, respectively, each switching mode allowing the voltage vectors within the corresponding group to be selected when it is set. A voltage vector selecting circuit 24 selects a voltage vector from among the voltage vectors which are allowed to be selected in the switching mode set by the switching mode determining circuit 23, the voltage vector being capable of approximating output currents to output current command values, respectively, and the circuit 24 outputs the selected voltage vector to a driver circuit.

Thus, according to the present invention, it is constantly judged whether a presently set switching mode is appropriate or not on the basis of the current deviation change direction, and a switching mode is set in accordance with the result of this judgement. It is therefore possible to set an optimal switching mode in a real-time manner in contrast to the conventional method in which a switching mode is determined on the basis of the phase angle of a target voltage which involves inferior detection accuracy and a delay in detection. Hence, it becomes possible to effect instantaneous value current control by means of an optimal voltage vector alone. As a result, it is possible to reduce or lower the switching frequency, losses and noise level in relation to the inverter and, at the same time, the degree of accuracy in current control can be increased.

Since the method of the present invention enables real-time control, the above-described advantages are available even in a transient state or when the impedance of the load changes momentarily, and stability and reliability against disturbance or other external noises are enhanced.

In addition, the present invention may be applied to a load in which the phase angle of a target voltage cannot be estimated.

The present invention may be carried out in a variety of forms such as those described below. To set and change switching modes, a first form which will be described below may be adopted.

According to the first form of the present invention, setting of switching modes is effected in such a manner that a quasi-target voltage phase angle which is approximated to a target voltage phase angle is detected, and switching modes are selected which may be a presently optimal switching mode when the detected quasi-target voltage phase angle is supposed to include an error within an allowable range. When a presently set switching mode is to be changed, a switching mode involving a reference change direction range to which said detected change direction belongs and which is determined by the presently selected voltage vector is selected from the selected switching modes so as to be set.

Thus, according to the first form of the present invention, a quasi-target voltage phase angle which is approximated to the phase angle of a target voltage value is employed, and a switching mode is selected from among a group of switching modes determined in correspondence with quasi-target voltage phase angles, respectively, on condition that a switching mode which is to be set satisfies specific conditions. It is therefore possible to obtain the advantage that optimal switching modes can be narrowed down to a certain extent, in addition to the above-described advantages of the present invention, so that setting of a switching mode and a voltage vector is simplified, and the processing time required for setting them is reduced, advantageously.

Since the quasi-target voltage phase angles need not be highly accurate but may involve a relatively large number of errors, the arithmetic processing required therefor is favorably simple, and it is unnecessary to provide an expensive sensor or the like when the present invention is carried out by an actual control apparatus.

In the present invention, further, second and third forms may be adopted in determination of a switching mode which is effected by the switching mode determining circuit 23 shown in FIG. 1.

Figure 2:
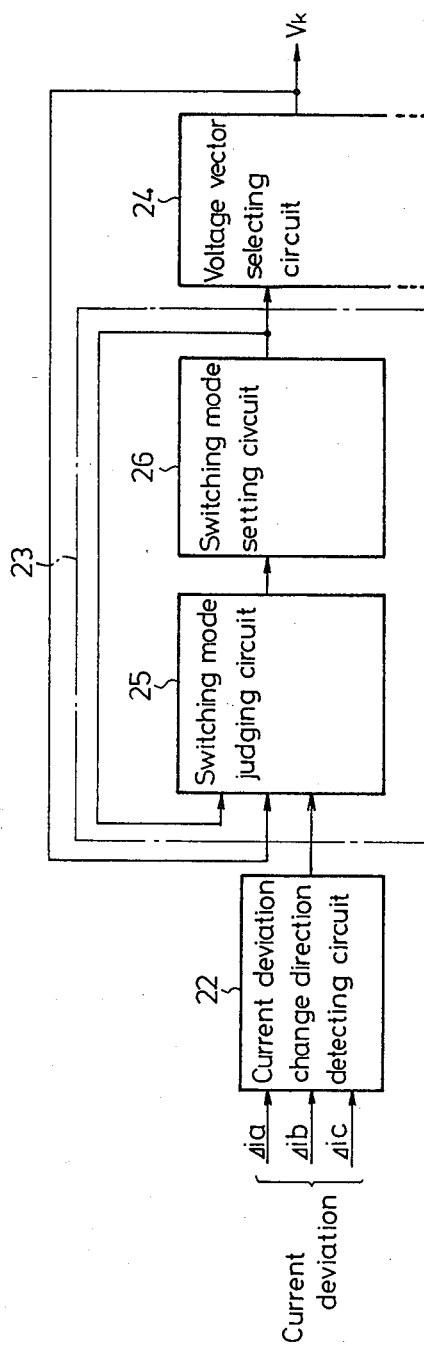
FIG. 2 is a block diagram showing a conceptional arrangement according to a second form of the present invention.

FIG. 2 shows a conceptional arrangement of an apparatus to which the second form of the present invention is applied.

As shown in FIG. 2, the switching mode determining circuit 23 consists of a switching mode judging circuit 25 and a switching mode setting circuit 26.

The switching mode judging circuit 25 is supplied with a detected current deviation change direction from the current deviation change direction detecting circuit 22, a presently set switching mode from the switching mode setting circuit 26, and a presently selected voltage vector from the voltage vector selecting circuit 24. The switching mode judging circuit 25 makes a judgement as to whether the presently set switching mode is appropriate or not on the basis of these input data items. When the presently set switching mode is judged to be inappropriate, the circuit 25 outputs a signal for changing switching modes to the switching mode setting circuit 26.

The above-described judgement is effected by making a comparison between the detected current deviation change direction and a range of reference directions of change of current deviations which is determined from two kinds of data, that is, the presently selected voltage vector and the presently set switching mode.

More specifically, when the detected current deviation change direction is within a range of reference current deviation change directions which is determined by the above-described two kinds of data, the presently set switching mode is judged to be appropriate, and the control is continued in this switching mode. On the other hand, when the detected current deviation change direction is out of the above-described reference change direction range, the presently set switching mode is changed to a switching mode having a reference change direction range to which the detected current deviation change direction belongs and which is determined in accordance with the presently selected voltage vector, a presently set switching mode, and the past conditions of the current deviations.

The switching mode setting circuit 26 is adapted to select one switching mode from a group of switching modes determined as initial modes in advance and set the selected mode as a present switching mode, and thereafter, the circuit 26 resets a switching mode at any time when it receives a switching mode change signal which is output from the switching mode judging circuit 25.

Figure 3:
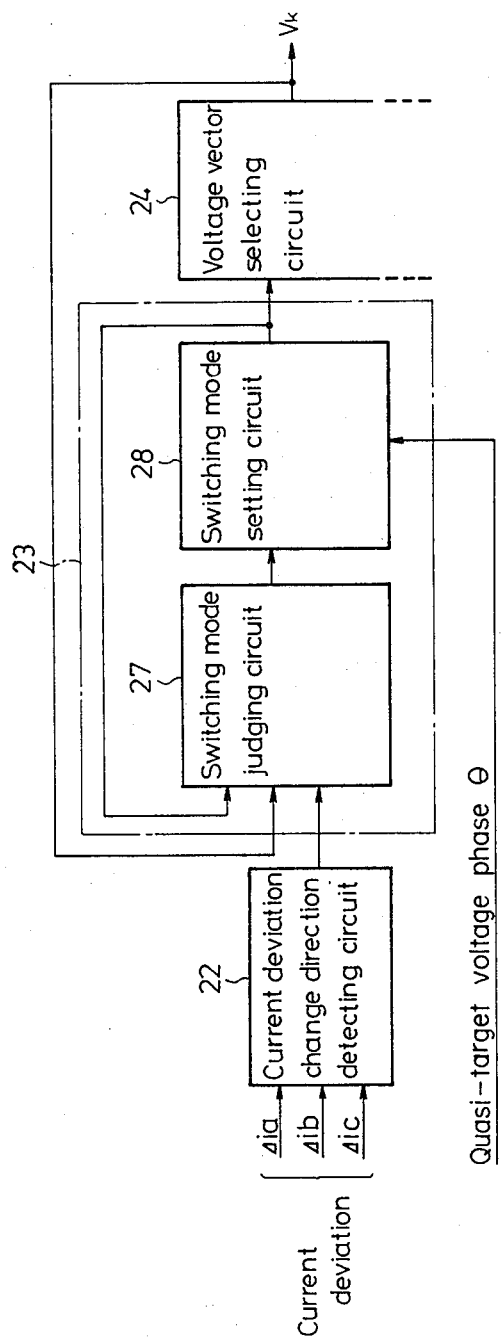
FIG. 3 is a block diagram showing a conceptional arrangement according to a third form of the present invention.

Referring next to FIG. 3, which shows the conceptional arrangement of an apparatus to which the third form of the present invention is applied, the switching mode determining circuit 23 consists of a switching mode judging circuit 27 and a switching mode setting circuit 28. The circuit 28 has a table stored therein, the table containing switching modes which are set in a manner similar to that in the second form and in correspondence with quasi-target voltage phase angles approximated to target voltage phase angles, with predetermined allowable errors, respectively.

The quasi-target voltage phase angle $\theta$ may readily be obtained by known techniques such as those described below.

(1) The output voltage of the inverter is directly detected and passed through a low-pass filter to extract the fundamental wave, and the phase angle thereof is obtained.

(2) When the impedance of the load is known in some measure, the phase difference between voltage and current is known; therefore, this phase difference is added to the phase angle of a current command value to obtain a quasi-target voltage phase angle.

(3) When an AC motor is vector-controlled, the phase of voltage is recognized in a vector control circuit; therefore, this recognized phase is utilized.

The switching mode judging circuit 27 is supplied with a detected current deviation change direction from the current deviation change direction detecting circuit 22, a presently set switching mode from the switching mode setting circuit 28 and a presently selected voltage vector from the voltage vector selecting circuit 24, and the circuit 27 makes a judgement as to whether the presently set switching mode is appropriate or not on the basis of these input data items. When the presently set switching mode is judged to be inappropriate, the circuit 27 outputs to the switching mode setting circuit 28 a signal for changing switching modes within a group of switching modes which are allowed to be set.

The above-described judgement is effected in a manner similar to that in the second form, that is, by making a comparison between the detected current deviation change direction and a range of reference current deviation change directions which is determined in accordance with two kinds of data, i.e., a presently selected voltage vector and a presently set switching mode.

More specifically, when the detected current deviation change direction is within a range of reference current deviation change directions which is determined in accordance with the above-described two kinds of data, the presently set switching mode is judged to be appropriate, and the control is effected in this mode, whereas, when the detected current deviation change direction is out of the above-described reference change direction range, the switching mode judging circuit 27 outputs a command for changing the switching mode to the switching mode setting circuit 28.

The switching mode setting circuit 28 is supplied with a quasi-target voltage phase angle which is related to the phase angle of a target voltage value. The circuit 28 selects a plurality of kinds of switching modes which are allowed to be set in correspondence with the quasi-target voltage phase angles from the switching modes. In other words, when the quasi-target voltage phase angle is supposed to include an error within an allowable range, switching modes which may be a presently optimal switching mode are selected, and one switching mode is then selected from among them on the basis of the above-described command for changing switching modes and set as a present switching mode. The switching mode which is allowed to be set and has been selected by the switching mode setting circuit 28 is changed from one to another at any time on the basis of the switching mode change command output from the switching mode judging circuit 27.

Thus, it is possible to select and set a switching mode which satisfies the conditions of both the detected current deviation change direction and the phase angle of a quasi-target voltage value.

Since the current deviation change direction detecting circuit 22 and the voltage vector selecting circuit 24 respectively have the same functions and arrangements as those in the second form, description thereof is omitted.

The present invention may adopt a fourth form described below in detecting the direction of change of the position of the end of the current deviation vector.

First, a quantizing map is set which has a plurality of quantizing regions defined on a complex plane by a plurality of threshold values set for output currents of various phases. Then, current deviations of the various phases are compared with the corresponding threshold values to obtain a quantizing region on the quantizing map to which the current deviations of all the phases belong mutually, and a direction which intersects both the obtained quantizing region and the quantizing region obtained during the previous control period is detected as a direction of change of the position of the end of the current deviation vector.

In the case of a three-phase inverter, if unit vectors in the directions of the three phases a, b and c are assumed to be $\bar{a}=j$, $\bar{b}=(\sqrt{3/2})-\frac{1}{2}\cdot j$ and $\bar{c}=-(\sqrt{3/2})-\frac{1}{2}\cdot j$, $j=\sqrt{-1}$, respectively, then the output current command value $\bar{i}^*$, the detected output current valve $\bar{i}$ and the current deviation vector $\Delta \bar{i}$ may be respectively represented by the following formulae (3):

$$\bar{i}^* = \tfrac{2}{3}(i_a^* \cdot \bar{a} + i_b^* \cdot \bar{b} + i_c^* \cdot \bar{c}) \qquad (3)$$

$$\bar{i} = \tfrac{2}{3}(i_a \cdot \bar{a} + i_b \cdot \bar{b} + i_c \cdot \bar{c})$$

-continued
$$\Delta \bar{i} = \tfrac{2}{3}(\Delta i_a \cdot \bar{a} + \Delta i_b \cdot \bar{b} + \Delta i_c \cdot \bar{c})$$

Accordingly, current deviations can be obtained by vector calculation using the formulae (3). However, vector calculation involves a fear of the arithmetic processing time becoming long disadvantageously.

Therefore, in the fourth form, three groups of four threshold values $S_{a1}$ to $S_{a4}$, $S_{b1}$ to $S_{b4}$ and $S_{c1}$ to $S_{c4}$ are respectively set for the three phases a, b and c, and a plurality of regions on a complex plane which are divided by these threshold values are defined as quantizing regions $R_j$. Further, a quantizing region $R_j$ to which the current deviations $\Delta i_a$, $\Delta i_b$ and $\Delta i_c$ of the three phases belong mutually is defined as a quantized current deviation $R_j$. Thus, a quantity which is correlated with the current deviation vector is obtained by a relatively simple arithmetic processing without carrying out any vector calculation.

It is possible to employ various methods such as those described below in selection of a voltage vector from among a group of voltage vectors which are allowed to be selected in a switching mode set on a particular occasion, said voltage vector being capable of restricting current deviations within a predetermined range including the origin on the complex plane.

(i) When the current deviations are going out of a predetermined range including the origin, a voltage vector is selected from among a group of voltage vectors which are allowed to be selected in a switching mode set on a particular occasion, said voltage vector enabling the direction of the central line of a range of reference change directions, which is determined in accordance with said voltage vector and the set switching mode, to be closest to a direction exact opposite to the current deviation vector.

(ii) When the current deviation are going out of a predetermined range including the origin of the complex plane, a voltage vector is selected from among a group of voltage vectors which are allowed to to be selected in a switching mode set on a particular occasion and to which a presently set voltage vector can be changed by effecting commutation for only one phase, said voltage vector enabling the direction of the central line of a range of reference change directions, which is determined in accordance with said voltage vector and the set switching mode, to be closest to a direction exactly opposite to the current deviation vector.

(iii) When the current deviations are completely out of a predetermined range including the origin on the complex plane, a means such as that described below may be adopted. The outside of the range is divided into regions the centers of which are respectively defined by the prolongations of various voltage vectors and regions each defined between the prolongations of each pair of adjacent voltage vectors. When the current deviations are present in a region the center of which is defined by the prolongation of a voltage vector, the voltage vector which is present on the central line of this region is unconditionally selected, whereas, when the current deviations are present in a region which is defined between the prolongations of a pair of adjacent voltage vectors, either one of the adjacent voltage vectors which involves a smaller number of phases that need commutation is selected.

(iv) When the current deviations are completely out of a predetermined range including the origin on the complex plane, another means such as that described below may be adopted. The outside of the range is divided into regions the centers of which are respectively defined by the prolongations of various voltage vectors, and when the current deviations are present in one of these regions, the voltage vector which is present on the central line of this region is selected, whereas, when the current deviations have moved to a region the center of which is defined by the prolongation of another voltage vector, the presently set voltage vector is changed to the voltage vector which is present on the central line of that region when a predetermined period of time has elapsed after the current deviations have moved to said region.

(v) To judge a point of time when the current deviations are going out of a predetermined range including the origin on the complex plane in order to determine a point of time when voltage vectors are to be changed from one to another, a plurality of kinds of said predetermined ranges are prepared, and the plurality of predetermined ranges and the current deviations are compared with each other to recognize a plurality of points of time for changing voltage vectors. The points of time for changing voltage vectors are changed in accordance with a presently set switching mode, a presently selected voltage vector and the past conditions of the current deviations.

(vi) To judge a point of time when the current deviations are going out of a predetermined range including the origin on the complex plane in order to determine a point of time when voltage vectors are to be changed from one to another, the predetermined range is changed in accordance with a presently set switching mode, a presently selected voltage vector and the past conditions of the current deviations, thereby changing the points of time for changing voltage vectors.

(Vii) It is also possible to select a voltage vector using the conventional method shown in FIGS. 30 to 33 in addition to the above. In such case, however, an appropriate switching mode is set at all times on the basis of the phase angle of a target voltage value which is calculated internally according to the present invention, whereas the target voltage phase angle is calculated externally in the prior art.

In the case of adopting the method (i), an optimal voltage vector alone can be selected so as to restrict the current deviations within a predetermined range.

In the case of adopting the method (ii), an optimal voltage vector alone can be selected, and voltage vectors can be changed by effecting commutation for only one phase so as to restrict the current deviations within a predetermined range.

In the case of adopting the method (iii), even when the current deviations are completely out of a predetermined range, voltage vectors can be changed without any fear of the selection of voltage vectors oscillating between two vectors, and it is possible to quickly converge the current deviations within a predetermined range.

In the case of adopting the method (iv), even when the current deviations are completely out of a predetermined range, it is possible to converge the current deviations within a predetermined range using a reduced number of threshold values and without any fear of the selection of voltage vectors oscillating between two vectors.

When the method (v) is adopted, it is possible to change voltage vectors from one to another with hysteresis characteristics, so that the operation is stabilized. In addition, it is possible to correct an average deviation of the current deviations by changing the points of time for changing voltage vectors in accordance with a presently set switching mode, a presently selected voltage vector and the past conditions of the current deviations.

When the method (vi) is adopted, it is possible to change voltage vectors from one to another with hysteresis characteristics, so that the operation is stabilized. In addition, it is possible to correct an average deviation of the current deviations by changing the points of time for changing voltage vectors in accordance with a presently set switching mode, a presently selected voltage vector and the past conditions of the current deviations. The abovedescribed processings can be executed with a reduced number of threshold values.

The present invention will be further explained below by control apparatuses to which two different embodiments of the present invention are applied, respectively.

Figure 4:
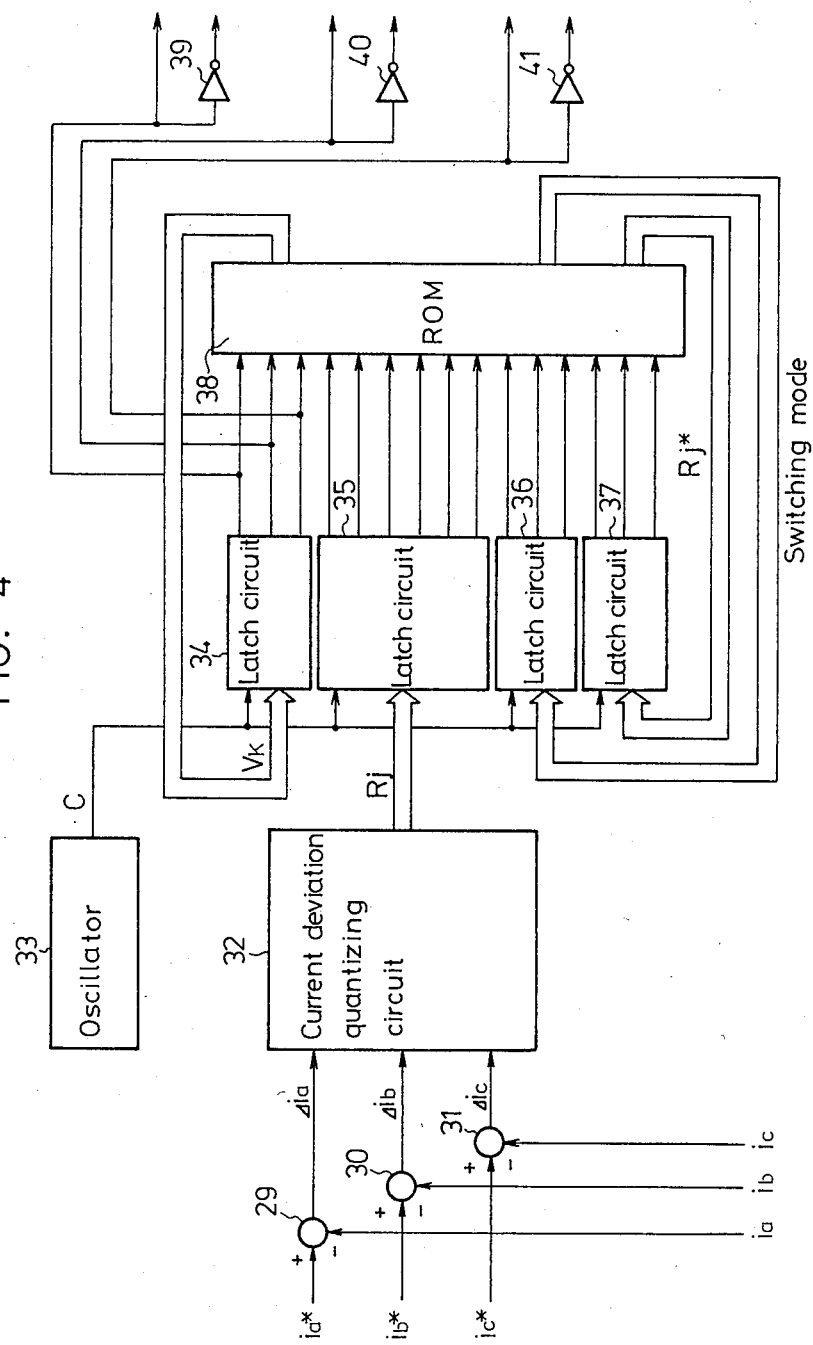
FIG. 4 is a block diagram showing a first embodiment of the present invention.
Figure 6:
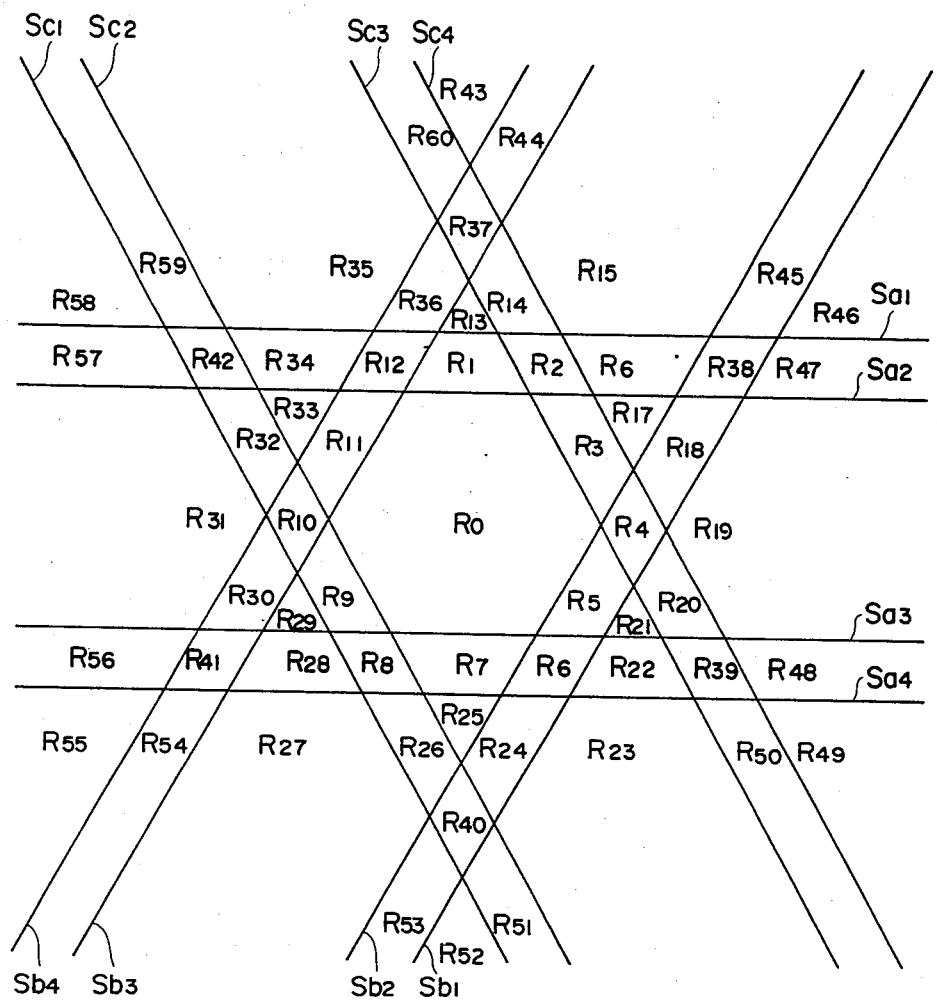
FIG. 6 shows a map employed to quantize current deviations.

First Embodiment:

FIG. 4 is a block diagram of a control apparatus to which a first embodiment according to the fourth form of the present invention is applied. In FIG. 4, adders 29, 30 and 31 respectively subtract detected output current values $i_a$, $i_b$ and $i_c$ of the phases a, b and c from output current command values $i_a^*$, $i_b^*$ and $i_c^*$, and output the resultant current deviations $\Delta i_a$, $\Delta i_b$ and $\Delta i_c$ to a current deviation quantizing circuit 32. The circuit 32 has a quantizing map stored therein which has a plurality of quantizing regions defined on a complex plane by a plurality of threshold values set for respective output currents of the three phases. In this embodiment, three groups of four threshold values $S_{a1}$ to $S_{a4}$, $S_{b1}$ to $S_{b4}$ and $S_{c1}$ to $S_{c4}$ are set for the phases a, b and c, respectively, and a complex plane is divided into a plurality of quantizing regions $R_j$ ($R_0$ to $R_{60}$) by these threshold values as shown in FIG. 6. The current deviation quantizing circuit 32 makes a comparison between the current deviations $\Delta i_a$, $\Delta i_b$ and $\Delta i_c$ which are respectively input thereto from the adders 29, 30 and 31 and the groups of threshold values $S_{a1}$ to $S_{a4}$, $S_{b1}$ to $S_{b4}$ and $S_{c1}$ to $S_{c4}$ of the three phases, respectively, to obtain a quantizing region $R_j$ to which the current deviations $\Delta i_a$, $\Delta i_b$ and $\Delta i_c$ of the respective instantaneous values of the three phases belongs mutually, the region $R_j$ being defined as a quantized current deviation $R_j$. This quantized current deviation $R_j$ is output to a latch circuit 35.

Figure 28:
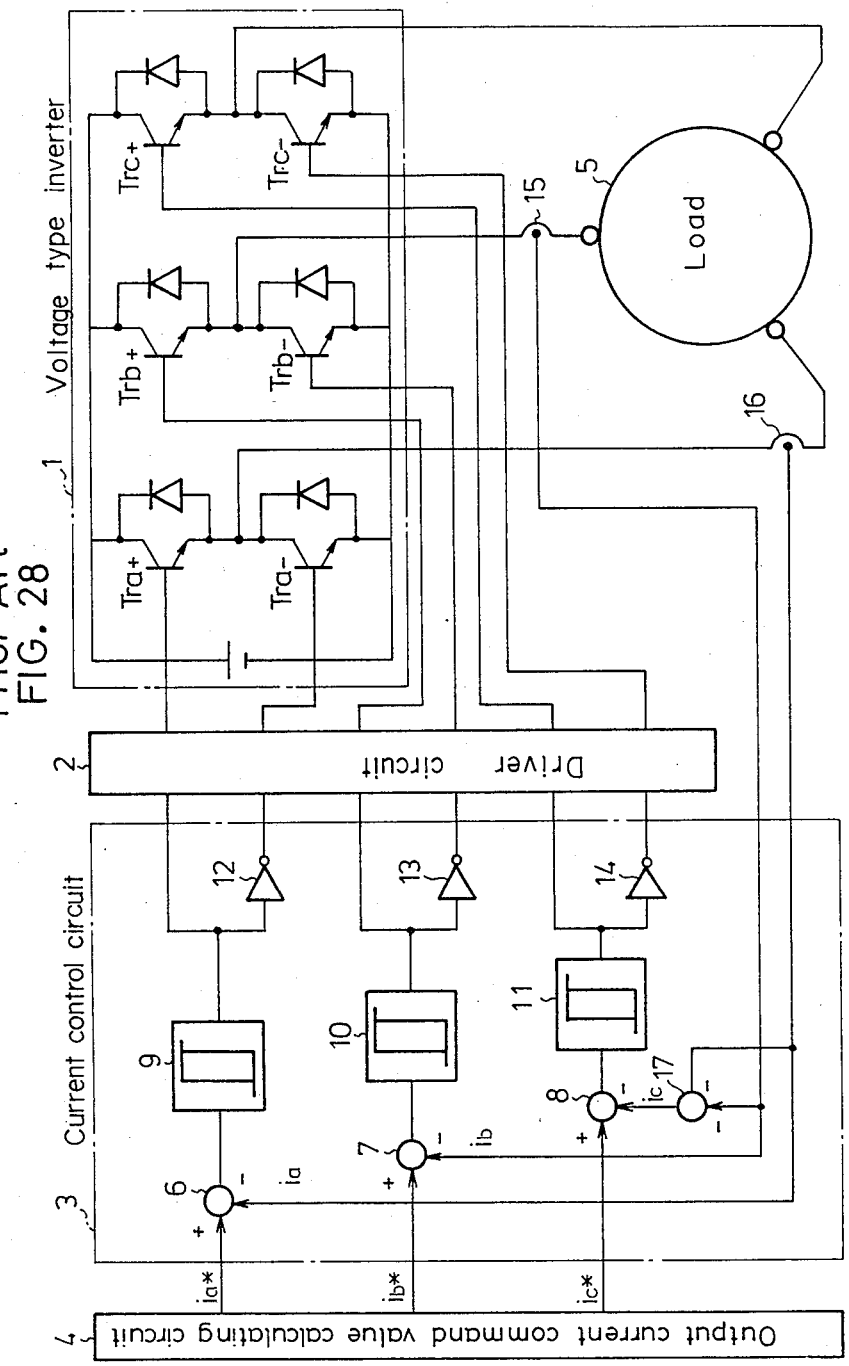
FIG. 28 is a block diagram of a conventional current-controlled inverter.
Figure 29:
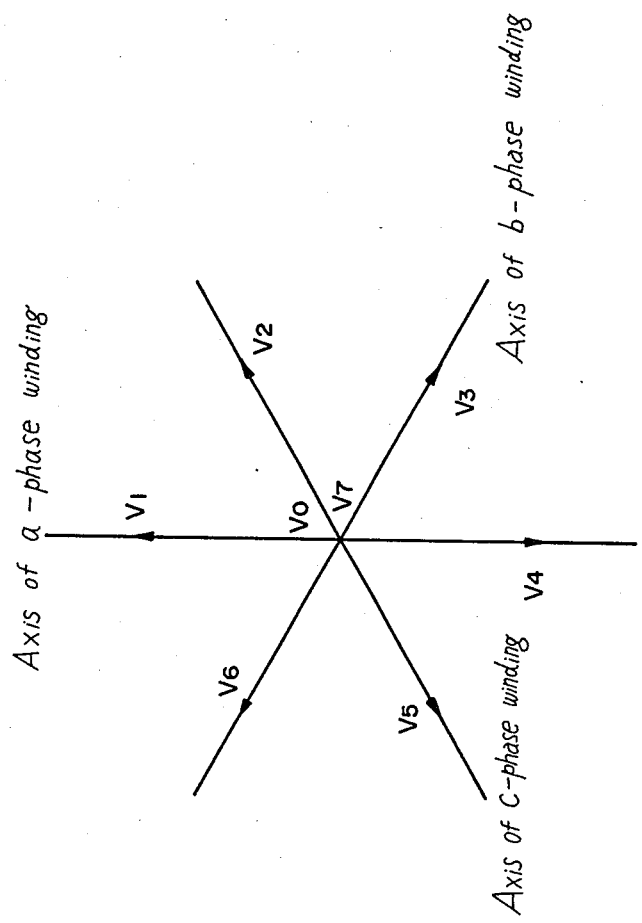
FIG. 29 is a view employed to explain voltage vectors.
Figure 30:
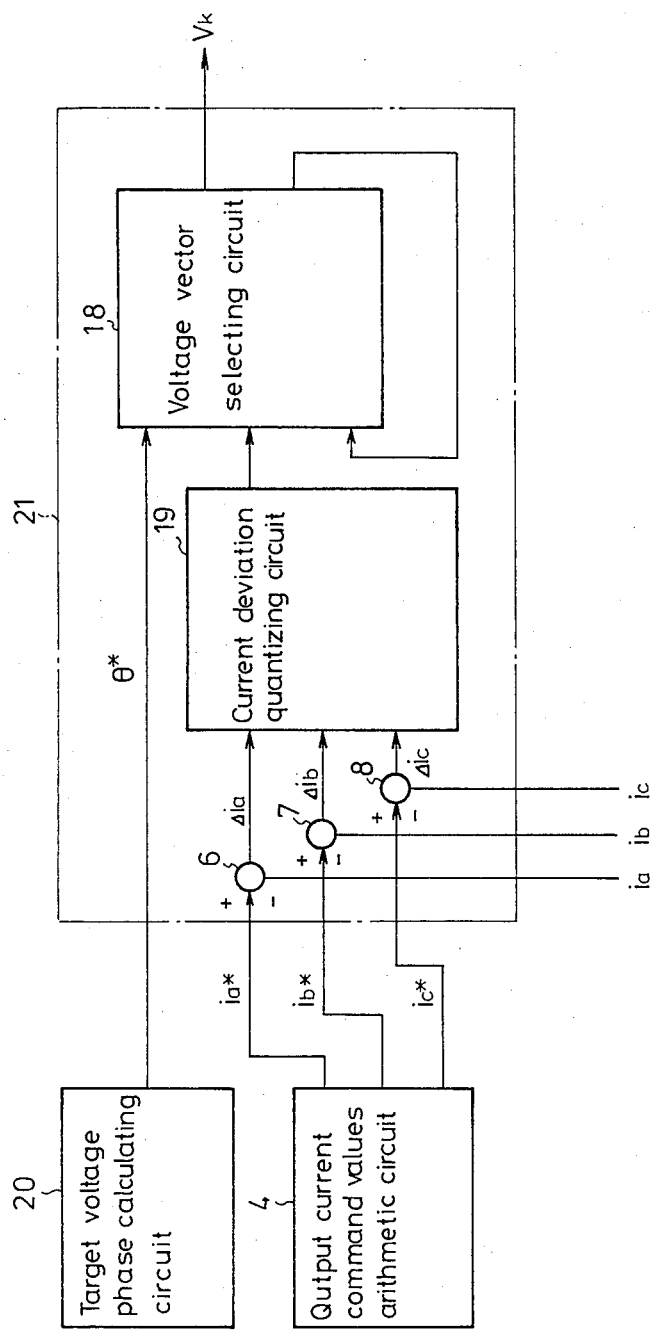
FIG. 30 is a block diagram of a conceptional arrangement employed to explain a conventional current control method.

An oscillator 33 outputs a clock signal C synchronized with the control cycle to latch circuits 34, 35, 36 and 37. The latch circuit 34 is supplied with a voltage vector command which is selected and output from a ROM 38. The latch circuit 34 latches and stores the input voltage vector command in synchronism with the clock signal C, and outputs the stored voltage vector command to the ROM 38 as a present voltage vector $V_k$. The data concerning a present voltage vector, which is output from the latch circuit 34, is also output to the driver circuit 2 shown in FIG. 28 as ON/OFF commands for the transistors $T_{ra}+$, $T_{rb}+$, $T_{rc}+$, $T_{ra}-$, $T_{rb}-$ and $T_{rc}-$ serving as switching elements of the inverter 1, the ON/OFF commands for the transistors $T_{ra}-$, $T_{rb}-$ and $T_{rc}-$ being formed by inverting the present voltage vector data with NOT circuits 39, 40 and 41.

The latch circuit 35, which is supplied with the quantized current deviation $R_j$ from the current deviation quantizing circuit 32, latches and stores the input quantized current deviation $R_j$ in synchronism with the clock signal C, and outputs the stored contents to the ROM 38.

The latch circuit 36 is supplied with a switching mode command which is set by and output from the ROM 38. The latch circuit 36 latches and stores the input switching mode command in synchronism with the clock signal C, and outputs the stored contents to the ROM 38 as a present switching mode.

The latch circuit 37 is supplied with a past quantized current deviation from the ROM 38, the past quantized current deviation $R_j^*$ having being detected during a previous control period. The latch circuit 37 latches and stores the past quantized current deviation $R_j^*$ in synchronism with the clock signal C, and outputs the stored contents to the ROM 38. In other words, the latch circuits 34, 35, 36 and 37 are employed to sample and hold necessary data.

The ROM 38 outputs a voltage vector command, a switching mode command and a past quantized current deviation $R_j^*$ on the basis of the present voltage vector $V_k$ input thereto from the latch circuit 34, the quantized current deviation $R_j$ input thereto from the latch circuit 35, the present switching mode input thereto from the latch circuit 36, and the past quantized current deviation $R_j^*$ input thereto from the latch circuit 37.

Figure 5:
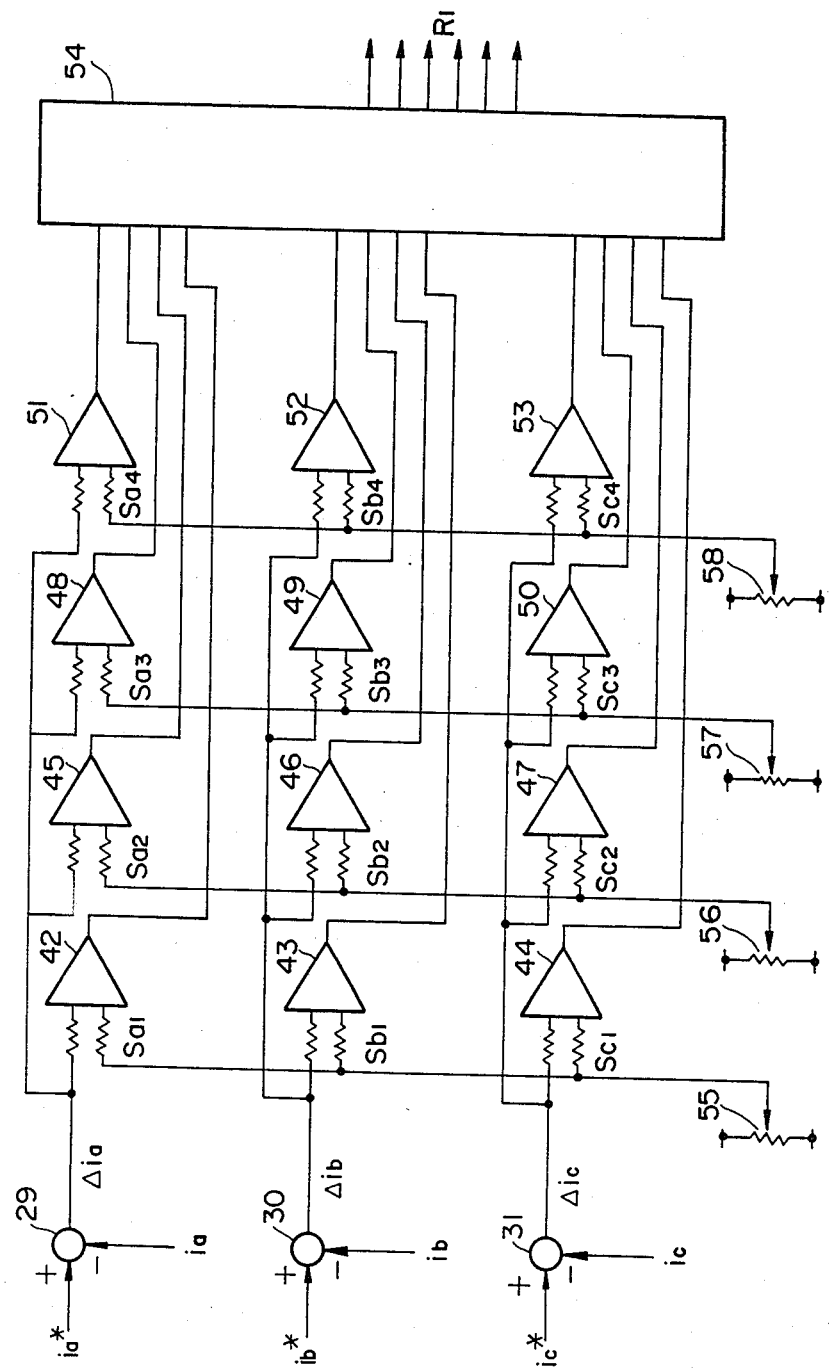
FIG. 5 is a detailed view showing the arrangement of a current deviation quantizing circuit in accordance with the first embodiment.

FIG. 5 shows the arrangement of a practical example of the current deviation quantizing circuit 32 in accordance with this embodiment. In FIG. 5, reference voltage setting devices 55, 56, 57 and 58 respectively output four levels of reference voltage to comparators 42 to 53 provided in correspondence with the three phases, the reference voltages corresponding to the threshold values $S_{a1}$ to $S_{a4}$, $S_{b1}$ to $S_{b4}$ and $S_{c1}$ to $S_{c4}$, respectively. The comparators 42 to 53 make a comparison between the current deviations $\Delta i_a$, $\Delta i_b$ and $\Delta i_c$ of the three phases which are output from the adders 29, 30 and 31 and the threshold values S1, S2, S3 and S4 output from the reference voltage setting devices 55, 56, 57 and 58, respectively, and output the results of the comparison to a ROM 54. The ROM 54 has a quantizing map stored therein which is constituted by a quantizing regions $R_j$ respectively corresponding to all possible results of the comparison effected by the comparators 42 to 53, the contents equivalent to the quantizing regions $R_j$ being read out using the results of comparison as read addresses. Thus, the ROM 54 recognizes a quantizing region $R_j$ corresponding to the input results of the comparison as a quantized current deviation $R_j$.

The arrangement of the ROM 38 will next be explained. It should be noted that the ROM 38 includes the functions of the current deviation change direction detecting circuit 22, the switching mode judging circuit 25, the switching mode setting circuit 26 and the voltage vector selecting circuit 24 (which are shown in FIG. 2) in the second form of the present invention.

In the ROM 38, a present switching mode, a present voltage vector $V_k$, a past quantized current deviation $R_j^*$ and a present quantized current deviation $R_j$ are input to the address side of the ROM 38 in such a manner that address bits are divided and assigned to these data items, respectively, and switching modes to be selected in the future, voltage vectors $V_k$ to be selected in the future, the past quantized current deviation $R_j^*$ to be used in the next judgement are stored in the ROM 38 so that these data items are output on the basis of the data items input to the address side. In addition, the relationship between each of the switching modes and voltage vectors $V_k$ which are allowed to be selected in each switching mode is set in accordance with the contents shown in FIG. 31 and Table 2, which have been described above, and a processing method is set in the ROM 38 to determine a switching mode and corresponding voltage vectors in accordance with an input quantized current deviation $R_j$.

Figure 7:
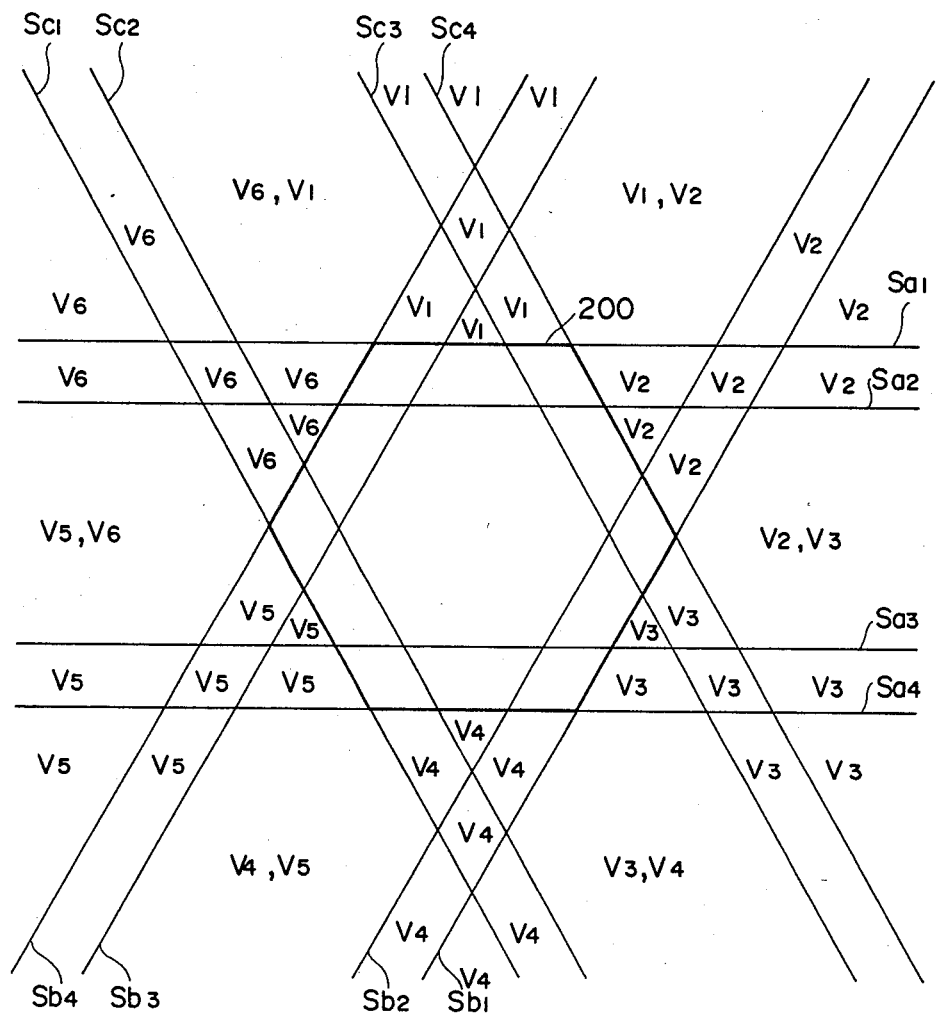
FIG. 7 shows a map of voltage vectors which are allowed to be selected, the voltage vectors being set in correspondence with quantized current deviations, respectively.

More specifically, when the quantized current deviation $R_j$ is present outside the outer hexagon shown by the thick line in FIG. 7, that is, in a quantizing region $R_j$ in which a current deviation exceeds the absolute value of the maximum threshold value for any one of the phases, a voltage vector set in correspondence with the quantizing region $R_j$ in FIG. 7 is unconditionally selected and output as a voltage vector command. It should be noted that, as to a quantizing region in which two voltage vectors are set in FIG. 7, a voltage vector is selected which involves a smaller number of times of switching of the switching elements required when a voltage vector is changed. When the quantized current deviation $R_j$ is present inside the inner hexagon, that is in a quantizing region $R_j$ in which each of the current deviations is less than the absolute value of the minimum threshold value for each phase, no change of voltage vectors is effected. As to a quantizing region $R_j$ between the inner and outer hexagons, a voltage vector $V_k$ to be selected is determined in accordance with a presently set switching mode and a presently selected voltage vector $V_k$, as will be described later. It should be noted that, when a voltage vector $V_k$ is to be changed for another, a present quantized current deviation $R_j$ is used as a past quantized current deviation $R_j^*$, whereas, when the voltage vector $V_k$ need not be changed, a past quantized current deviation $R_j^*$ which has been sampled and held in the latch circuit 37 is used as a past quantized current deviation $R_j^*$. Thus, it is possible to recognize the starting point of the locus of changes in the current deviation $R_j$ at all times.

The following is a description of the processing executed when the quantized current deviation $R_j$ is present in a quantizing region $R_j$ between the inner and outer hexagons in the quantizing map shown in FIG. 7. As described above, if an appropriate switching mode is set, the current deviation change direction must converge within a predetermined range, that is, a reference change direction range, which is determined by a presently set switching mode A to F and a presently selected voltage vector $V_k$. The reference change direction ranges are shown in Table 3 and in FIGS. 8 to 13 in which they are represented by shadowed areas and in which the starting point of each current deviation change direction is shifted to the origin on a complex plane.

TABLE 3

| Set switching modes | Selected voltage vectors | Ranges of reference change direction |
|---|---|---|
| A | $V_1$ | $r_3$ |
|   | $V_2$ | $r_5$ |
|   | $V_0, V_7$ | $r_1$ |
| B | $V_2$ | $r_4$ |
|   | $V_3$ | $r_6$ |
|   | $V_0, V_7$ | $r_2$ |
| C | $V_3$ | $r_5$ |
|   | $V_4$ | $r_1$ |
|   | $V_0, V_7$ | $r_3$ |
| D | $V_4$ | $r_6$ |
|   | $V_5$ | $r_7$ |
|   | $V_0, V_7$ | $r_4$ |
| E | $V_5$ | $r_1$ |
|   | $V_6$ | $r_3$ |
|   | $V_0, V_7$ | $r_5$ |

TABLE 3-continued

| Set switching modes | Selected voltage vectors | Ranges of reference change direction |
|---|---|---|
| F | $V_6$ | $r_2$ |
|   | $V_1$ | $r_4$ |
|   | $V_0, V_7$ | $r_6$ |

The relationship between the current deviation $\Delta i$, the target voltage value $e_0$ and the presently selected voltage vector $V_n$ may be represented by the following formula:

$$L\frac{d\Delta i}{dt} \approx e_0 - V_n \qquad (4)$$

Figure 35:
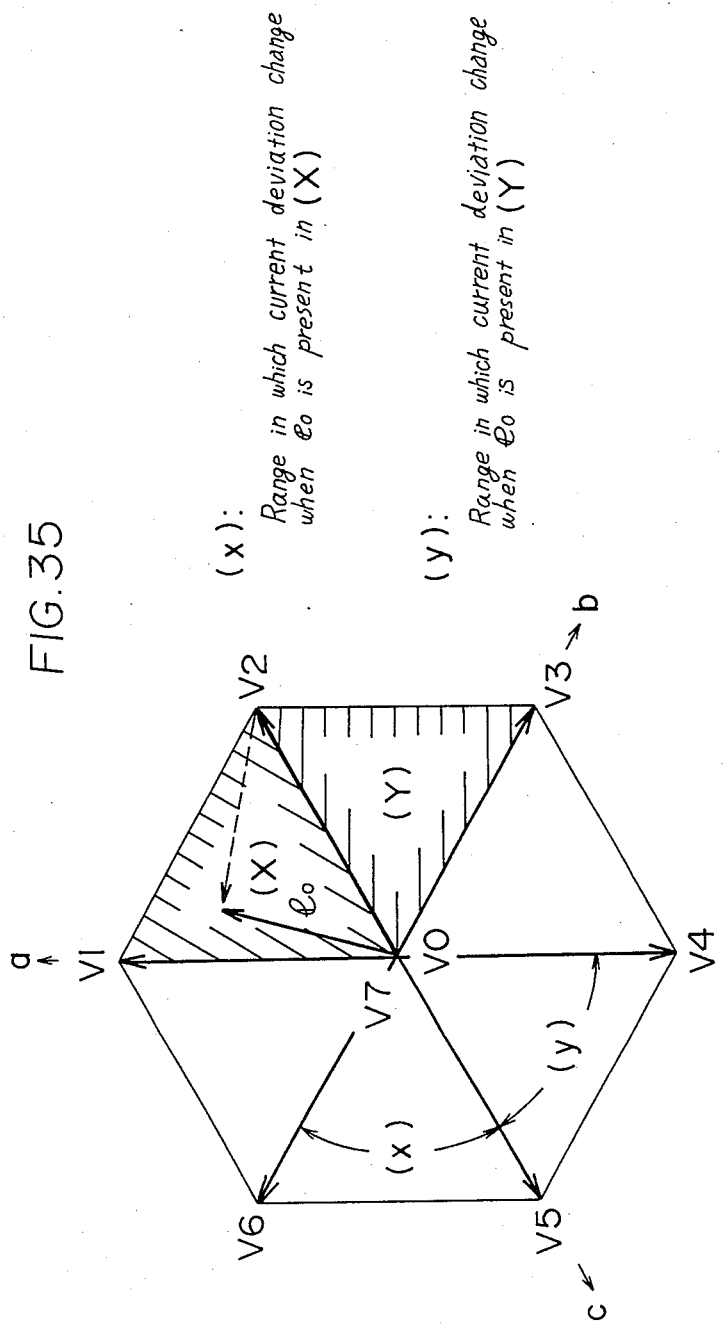
FIGS. 35 and 36 respectively show practical examples of ranges of directions in which current deviations change.

Accordingly, assuming that the target voltage value $e_0$ is present in the region (X) and the presently selected voltage vector is $V_2$ as shown in FIG. 35, the current deviation will change in the direction shown by the broken line. If the direction of change of the current deviation, shown by the broken line, is replaced by a direction of change from the origin, it will be found that the current deviation will change within a range of directions in the region (x).

Figure 36:
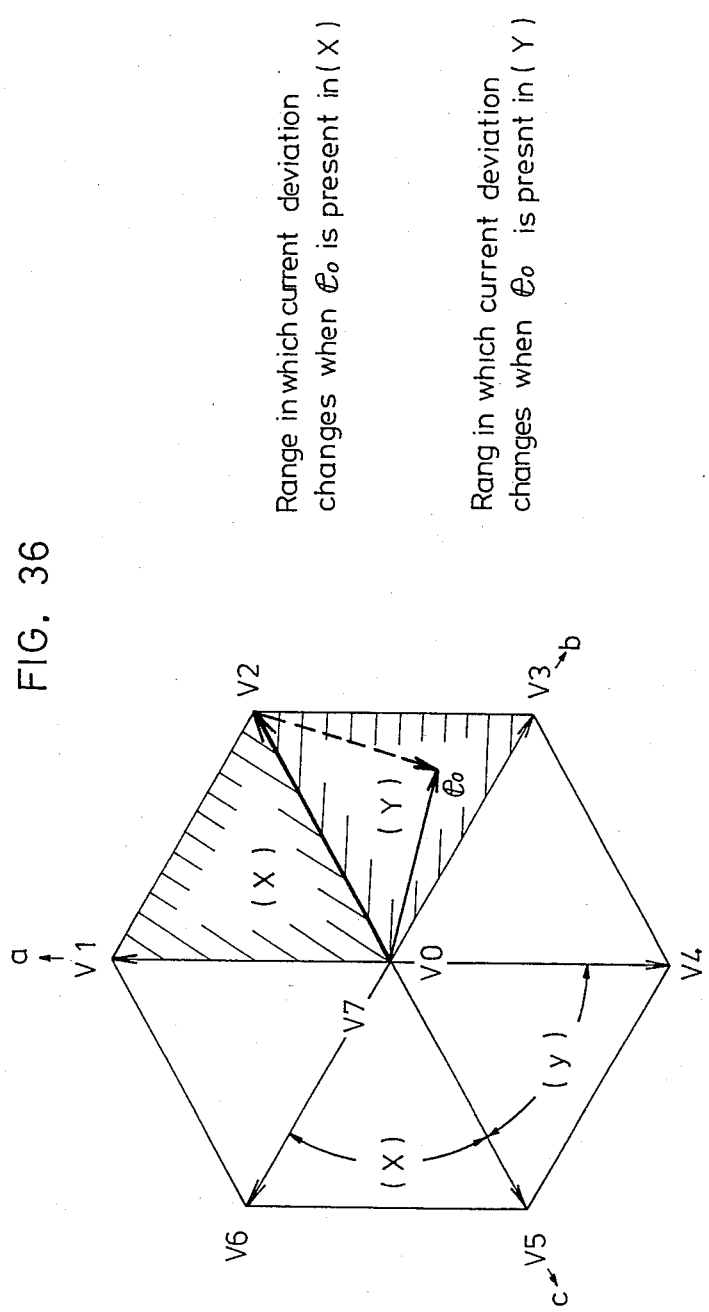

On the other hand, assuming that the target voltage value $e_0$ is present in the region (Y) and the presently selected voltage vector is $V_2$ as shown in FIG. 36, the current deviation change direction will be found to be within the region (y) if the starting point thereof is shifted to the origin on the complex plane on the basis of the same idea as in the case of FIG. 35.

Thus, the present quantized current deviation $R_j$ and the past quantized current deviation $R_j^*$ are compared with each other to detect a current deviation change direction, and it is judged whether a presently set switching mode is appropriate or not in accordance with the result of a judgement as to whether or not the detected current deviation change direction is within the corresponding reference change direction range.

Figure 37:
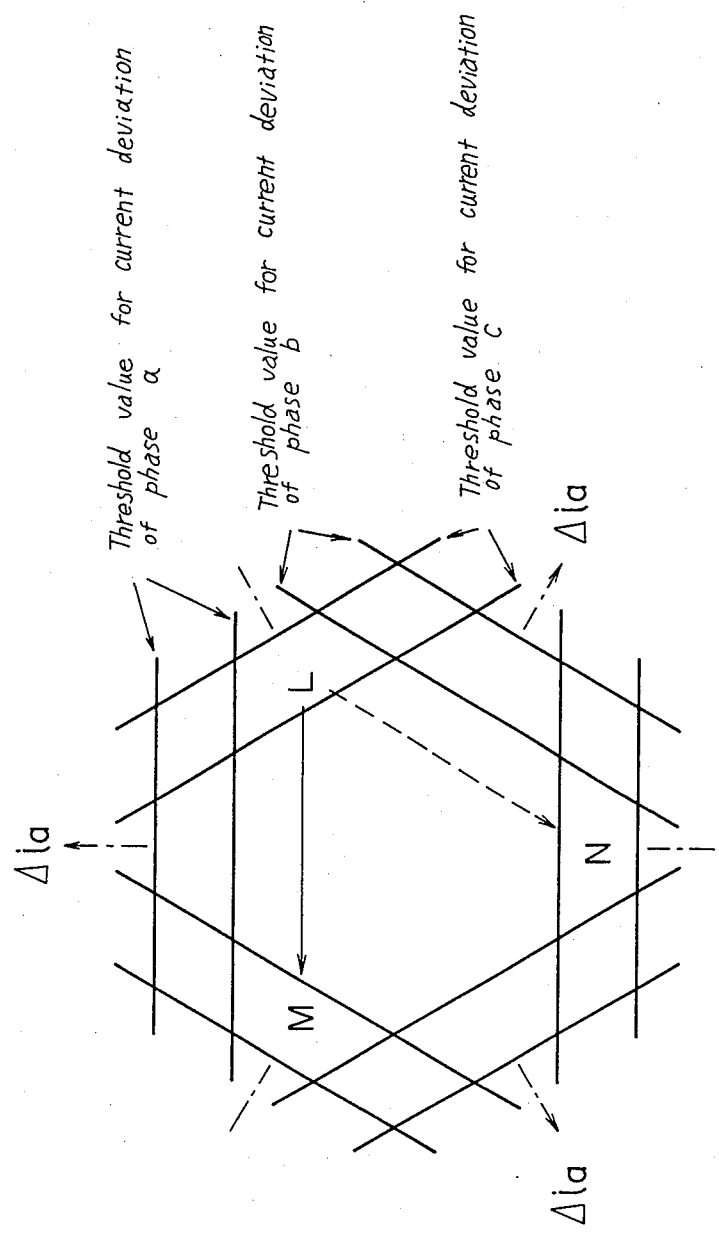
FIG. 37 shows a direction in which current deviations change.

Referring next to FIG. 37, which shows current deviation change directions, the current deviations $\Delta i_a$, $\Delta i_b$ and $\Delta i_c$ of the three phases are respectively compared with the threshold values for these phases. Since in the illustrated example four threshold values are provided for each phase, ranges within which the current deviation of each phase may be present can be limited to, for example, five levels, from the result of comparison.

When the results of the comparison are considered simultaneously for the three phases, the current deviation can be recognized on the complex plane shown in FIG. 37. In other words, it is possible to know a region surrounded by threshold values within which the current deviation is present. The region thus found is a region in which the quantized current deviation is present.

The current deviation change direction is estimated in such a manner that a region within which the past current deviation has been present (the past quantized current deviation, e.g., L) is stored in memory in advance, while a region within which the present current deviation is present (the present quantized current deviation, e.g., M or N) is recognized, and the current deviation change direction is estimated from a straight line which passes through these regions, for example, by the solid line from L to M, and the broken line from L to N.

It should be noted that, since a region within which the quantized current deviation is present has a certain area, the current deviation change direction has so a certain range.

On the basis of these ideas, the way in which switching modes are changed from one to another will be explained below with reference to FIG. 38. In the figure, the reference symbols A and B denote two different modes, respectively.

Figure 38:
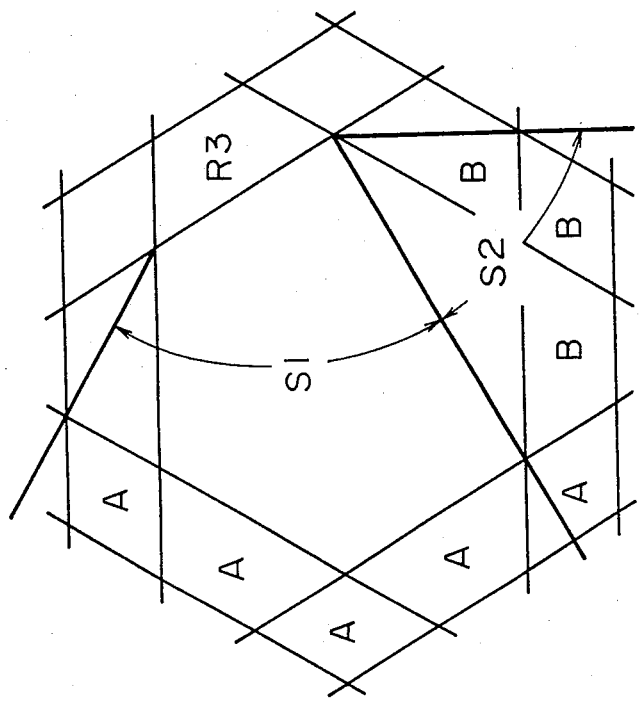
FIG. 38 shows the way in which switching modes are changed from one to another.

It is assumed that, in FIG. 38, the presently set switching mode is A (a mode which is set when the target voltage value $e_0$ is estimated to be in the region (X)), and the presently selected voltage vector is $V_2$.

In such case, if the current deviation has changed in the direction $S_1$ from the region $R_3$ as shown in FIG. 38, the current deviation change direction may be recognized to be within the region (x) shown in FIG. 36, and the target voltage value $e_0$ may be estimated to be in the region (X). Accordingly, it is found that the presently set mode A should be maintained.

If the current deviation has changed in the direction $S_2$ from the region $R_3$ as shown in FIG. 38, the current deviation change direction is recognized to be within the region (y) shown in FIG. 37, and the target voltage value $e_0$ is estimated to be present within the region (Y). Accordingly, the presently set mode A should be changed to the mode B.

The following is a description of a practical example based on the above-described principle of changing switching modes from one to another.

Figure 13:
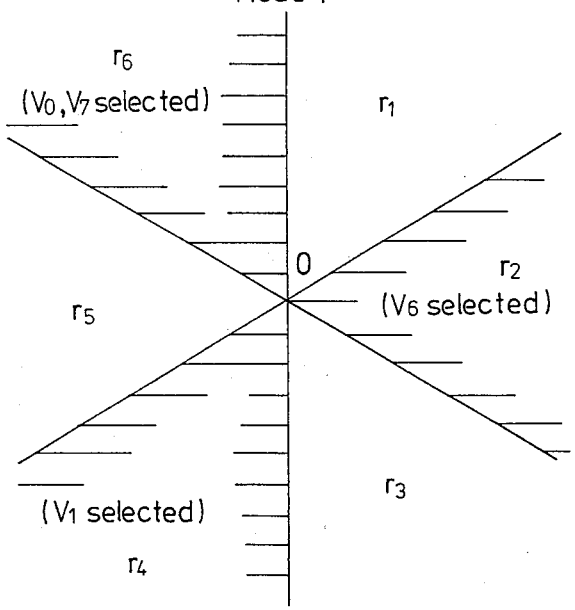
FIG. 13 shows reference directions of change when the switching mode is F.
Figure 14:
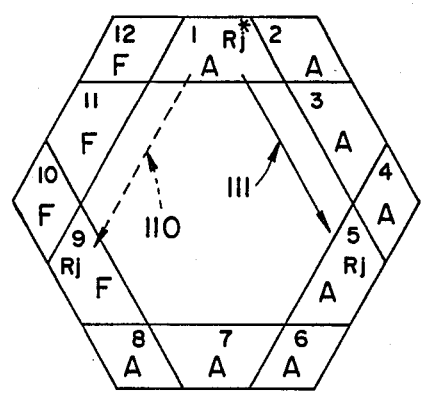
FIG. 14 shows a map of switching modes.

For example, referring to FIG. 14, it is assumed that the presently set switching mode is A, the presently selected voltage vector is $V_1$, the past quantized current deviation $R_j^*$ is $R_1$, and the present quantized current deviation $R_j$ is $R_9$. In such case, it is considered that the current deviation has changed in the direction of the broken-line arrow 110, and this direction of change is found, from FIGS. 8 and 13, to be different from the reference change direction at the time when the switching mode is A and the selected voltage vector is $V_1$ but coincident with the reference change direction at the time when the switching mode is F and the selected voltage is $V_1$. It is therefore known that the switching mode must be changed to the mode F.

If the presently set switching mode is A, the presently selected voltage vector $V_k$ is $V_1$, the past quantized current deviation $R_j^*$ is $R_1$, and the present quantized current deviation $R_j$ is $R_5$, then, it is considered that the current deviation has changed in the direction of the solid-line arrow 111 in FIG. 14. Since this direction of change is within the range of reference change direction shown in FIG. 8, the switching mode command need not be changed, and the mode A is therefore maintained.

The above-described processing is executed on the basis of data written in the ROM 38.

More specifically, as described above, a present switching mode, a present voltage vector $V_k$, a past quantized current deviation $R_j^*$ and a present quantized current deviation $R_j$ are input to the address side of the ROM 38 in such a manner that the address bits are allotted among these data items. Therefore, switching mode commands corresponding to the above-described input data are written in advance into output bits of the ROM 38 which are allotted to the switching mode, as a function of each address.

For example, a command for the mode F to be set is written in advance at an address which corresponds to a state of input data which represents the fact that the switching mode should be changed from the mode A to the mode F. Similarly, a command for the mode A to be set is written in advance at an address which corresponds to a state of input data which represents the fact that the switching mode should remain in the mode A.

Thus, when a present switching mode, a present voltage vector $V_k$, a past quantized current deviation $R_j^*$ and a present quantized current deviation $R_j$ are input to the address side of the ROM 38, an appropriate switching mode command is instantaneously read out from the ROM 38.

It should be noted that maps such as that shown in FIG. 14 are prepared as functions with respect to all the switching modes A to F, all the voltage vectors $V_k$, all possible past quantized current deviations $R_j^*$ and all possible present quantized current deviations $R_j$, and stored in the ROM 38 in advance so that a judgement such as that described above is made at all times during control process.

The following is a description of a method of selecting a voltage vector $V_k$ when the current deviation $R_j$ enters a region between the inner and outer hexagons.

Figure 15:
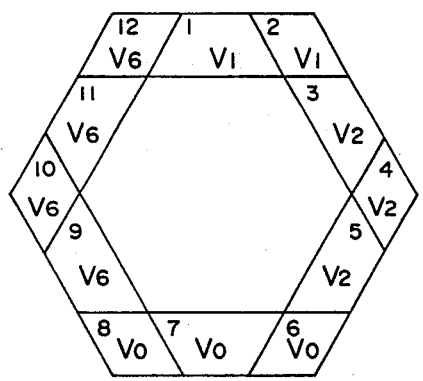
FIG. 15 shows a map of voltage vectors.

Basically, one voltage vector $V_k$ which enables the current deviation $R_j$ to be decreased most effectively and involves the smallest number of times of switching is selected from among voltage vectors $V_k$ which are allowed to be selected in a switching mode which is maintained or newly set. Accordingly, in a manner similar to that in the case of the switching mode, voltage vector selecting maps such as that shown in FIG. 15 are prepared as functions with respect to all the switching modes, all the voltage vectors $V_k$, all possible past quantized current deviations $R_j^*$ and all possible present quantized current deviations $R_j$ and stored in the ROM 38 in advance so that an optimal voltage vector $V_k$ is selected in conformity to the above-described basis at all times duing control process.

By virtue of the above-described arrangement, the current deviations $\Delta i_a$, $\Delta i_b$ and $\Delta i_c$ of the three phases which are respectively output from the adders 29, 30 and 31 are quantized in the current deviation quantizing circuit 32, and the quantized current deviation $R_j$ is latched by the latch circuit 35 for each control period so as to be stored therein. When the quantized current deviation $R_j$ is input to the ROM 38 from the latch circuit 35, the contents of an address, which is determined by a past quantized current deviation $R_j^*$ input to the ROM 38 from the latch circuit 37, a present voltage vector $V_k$ input thereto from the latch circuit 34, and a present switching mode input thereto from the latch circuit 37, are read out and output as a voltage vector $V_k$ which is to be selected. In other words, the contents of the ROM 38 are prepared in advance in accordance with the above-described processing procedure, so that an optimal voltage vector is selected and output simply by inputting a quantized current deviation $R_j$ to the ROM 38.

As described above, according to the first embodiment of the present invention, the presently set switching mode is judged to be appropriate or not on the basis of the current deviation change direction rather than on the basis of the phase angle of a target voltage value, to set an appropriate switching mode, and one voltage vector which enables the current deviation to be decreased most efficiently is selected from among voltage vectors set in correspondence with the set switching mode. Therefore, the control process involves an extremely small delay in response, so that it is possible to effect a current control which permits an optimal voltage vector alone to be selected at all times even during a transient state or even when the load impedance changes momentarily. In consequence, it becomes possible to reduce the switching frequency, losses, noise level, etc. in relation to the inverter and increase the degree of accuracy in current control. In addition, stability and reliability against disturbance or other external noise are enhanced advantageously. Since the phase angle of a target voltage value is not detected in the first embodiment, it is unnecessary to provide a processing circuit or the like which would otherwise be needed therefor, and this embodiment may be applied to a load which does not allow estimation of the phase angle of a target voltage value.

In the first embodiment, the detection of a current deviation change direction, the judgement and setting of a switching mode, and the selection of a voltage vector are carried out by the ROM 38 alone. Accordingly, the size of the current control circuit is reduced, and this is advantageous from the economic point of view. When the current deviation is relatively large, a voltage vector which enables the current deviation to be decreased most quickly is selected unconditionally as shown in FIG. 7, which means that the response is improved greatly. Since regions each of which enables selection of two kinds of voltage vector $V_k$ are provided outside the outer hexagon 200 as shown in FIG. 7, the selection of these voltage vectors $V_k$ results in a hysteresis operation, so that it is possible to prevent the occurrence of oscillation. On the other hand, the conventional method shown in FIG. 32 inevitably involves oscillation which occurs on a boundary between two adjacent regions.

Figure 16:
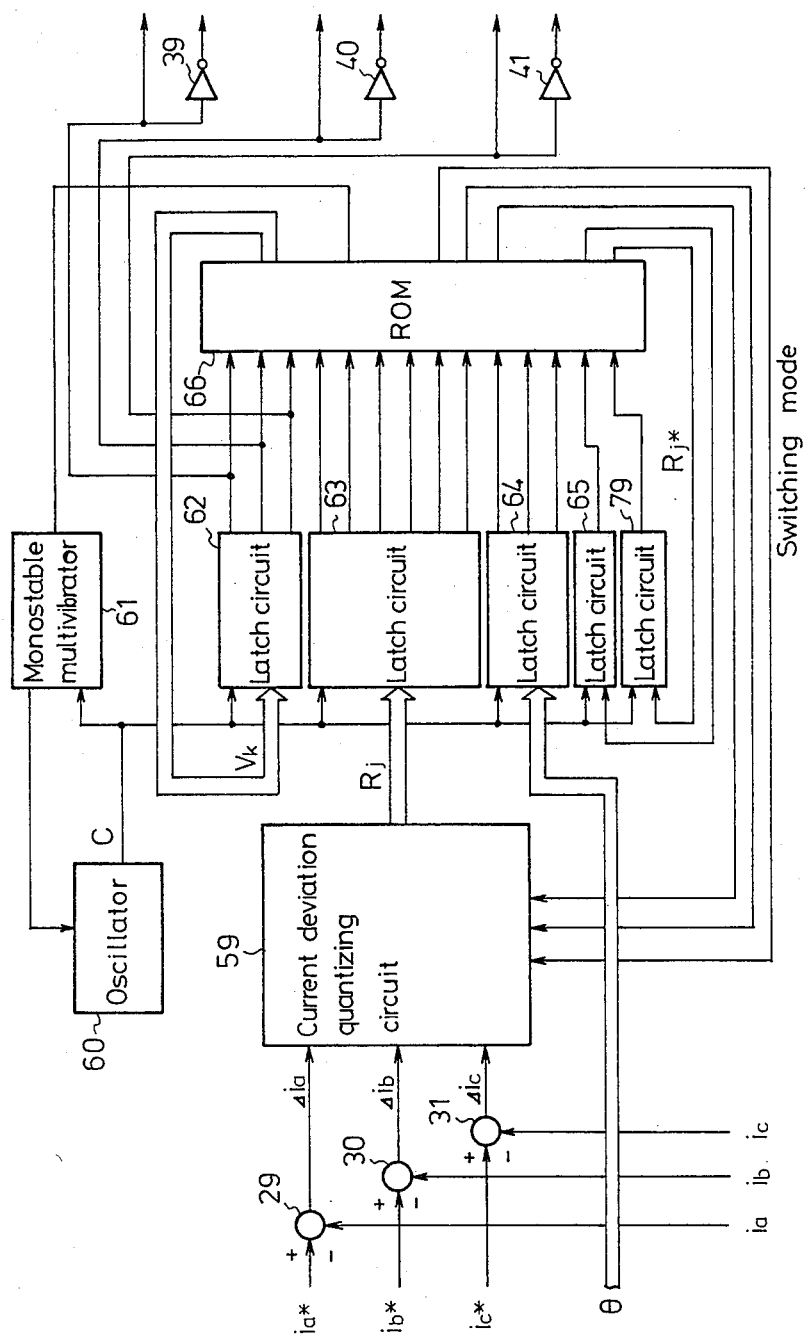
FIG. 16 is a block diagram showing a second embodiment of the present invention.

In the first embodiment, a voltage vector to be selected is determined on the basis of a selected switching mode, a present voltage vector and a quantized current deviation. Therefore, the order according to which voltage vectors are selected can be specified in details, and it is possible to change all the voltage vectors by effecting commutation for only one phase. Accordingly, the switching frequency of the inverter can be lowered, and hence it is possible to reduce the switching loss and lower the noise level. In the conventional method, no present voltage vector is fed back, and therefore the order according to which voltage vectors are selected may become irregular, so that two phases may simultaneously be subjected to commutation when voltage vectors are changed, which undesirably leads to an increase in the switching frequency. Second Embodiment:

FIG. 16 is a block diagram of a control apparatus to which a second embodiment according to the third form of the present invention is applied. In FIG. 16, elements which have the same functions as those in the first embodiment shown in FIG. 4 are denoted by the same reference numerals, and description thereof is omitted.

Figure 18:
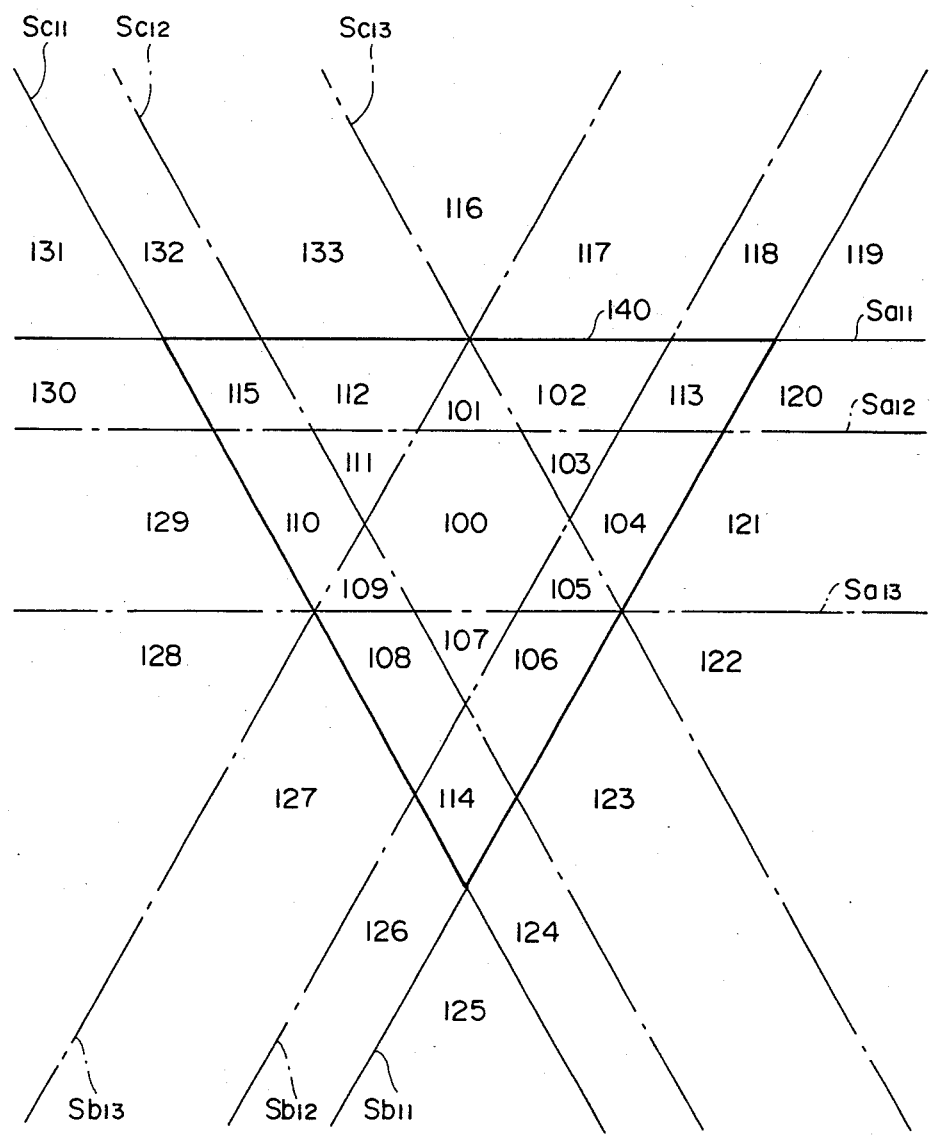
FIG. 18 shows a map employed to quantize current deviations.

A current deviation quantizing circuit 59 stores a quantizing map having a plurality of quantizing regions defined on a complex plane by a plurality of threshold values set for respective output currents of the three phases. In this embodiment, as shown in FIG. 18, three groups of three threshold values $S_{a11}$, $S_{a12}$, $S_{a13}$, $S_{b11}$, $S_{b12}$, $S_{b13}$, $S_{c11}$, $S_{c12}$ and $S_{c13}$ are set for the phases a, b and c, respectively, and a complex plane is divided into a plurality of quantizing regions $R_j$ ($R_{100}$ to $R_{133}$) by these threshold values. It should be noted that, in FIG.

18, the symbol "R" for the quantizing regions is omitted.

Two of the three threshold values for each phase are exchanged for each other in response to a threshold value exchange signal delivered from a ROM 66.

The current deviation quantizing circuit 59 makes a comparison between the current deviations $\Delta i_a$, $\Delta i_b$ and $\Delta i_c$ which are respectively input thereto from the adders 29, 30 and 31 and the groups of threshold values $S_{a11}$ to $S_{a13}$, $S_{b11}$ to $S_{b13}$ and $S_{c11}$ to $S_{c13}$ for the three phases, respectively, to obtain a quantizing region $R_j$ to which the current deviations $\Delta i_a$, $\Delta i_b$ and $\Delta i_c$ of the respective instantaneous values of the three phases belong mutually, the region $R_j$ being defined as a quantized current deviation $R_j$. This quantized current deviation $R_j$ is output to a latch circuit 63.

An oscillator 60 outputs a clock signal C synchronzied with the control cycle to a monostable multivibrator 61 and latch circuits 62, 63, 64, 65 and 79. It should be noted that the oscillator 60 is supplied with the output of the monostable multivibrator 61, and when this output is active, the output of the clock signal C is suspended. The monostable multivibrator 61 is supplied with a voltage vector change inhibiting command from the ROM 66, and is adapted to output a clock suspension signal of a predetermined period to the oscillator 60 in synchronism with the clock signal from the oscillator 60.

The latch circuit 62 is supplied with a voltage vector command which is output from the ROM 66. The latch circuit 66 latches and stores the input voltage vector command in synchronism with the clock signal C from the oscillator 60, and outputs the stored voltage vector command to the ROM 66 as a present voltage vector. The data concerning a present voltage vector, which is output from the latch circuit 62, is also output to the driver circuit 2 as ON/OFF commands for the transistors $T_{ra}+$, $T_{rb}+$, $T_{rc}+$, $T_{ra}-$, $T_{rb}-$ and $T_{rc}-$ serving as switching elements of the inverter 1 in a manner similar to that in the first embodiment, the ON/OFF commands for the transistors $T_{ra}-$, $T_{rb}-$ and $T_{rc}-$ being formed by inverting the present voltage vector data with NOT circuits 39, 40 and 41. The latch circuit 63, which is supplied with the quantized current deviation $R_j$ from the current deviation quantizing circuit 59, latches and stores the input quantized current deviation $R_j$ in synchronism with the clock signal C, and outputs the stored contents to the ROM 66. The latch circuit 64 is supplied with a quasi-target voltage phase angle corresponding to the phase angle of a target voltage value which is obtained by a means (not shown). The latch circuit 64 latches and stores the quasi-target voltage phase angle in synchronism with the clock signal C, and outputs the stored data to the ROM 66. The latch circuit 65 is supplied with a switching mode command which is set by and output from the ROM 66. The latch circuit 65 latches and stores the input switching mode command in synchronism with the clock signal C, and outputs the stored data to the ROM 66 as a present switching mode. The latch circuit 79 is supplied with a past quantized current deviation $R_j^*$ from the ROM 66. The latch circuit 79 latches and stores the past quantized current deviation $R_j^*$ in synchronism with the clock signal C, and outputs the stored data to the ROM 66.

The latch circuits 62, 63, 64, 65 and 79 are employed to sample and hold necessary data items, respectively.

The ROM 66 outputs a voltage vector command, a voltage vector change inhibiting signal, a threshold value exchange command, a switching mode command and a past quantized current deviation $R_j^*$ on the basis of a present voltage vector $V_k$ input thereto from the latch circuit 62, a present quantized current deviation $R_j$ input thereto from the latch circuit 63, a quasi-target votlage phase angle $\theta$ input thereto from the latch circuit 64, a present switching mode input thereto from the latch circuit 65, and a past quantized current deviation $R_j$ input thereto from the latch circuit 79.

Figure 17:
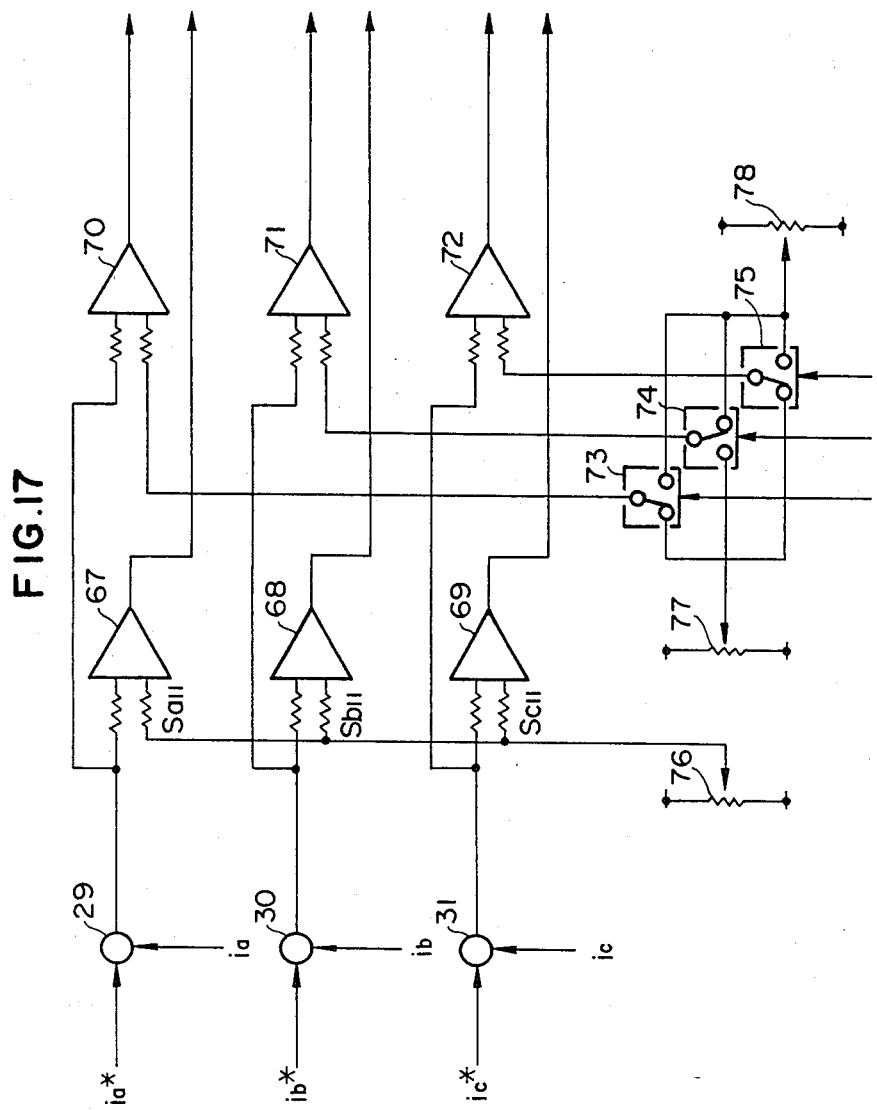
FIG. 17 is a detailed view showing the arrangement of a current deviation quantizing circuit in accordance with the second embodiment.

FIG. 17 shows the arrangement of a practical example of the current deviation quantizing circuit 59 in accordance with this embodiment. In FIG. 17, a reference voltage setting device 76 outputs a reference voltage to comparators 67, 68 and 69 for the three phases, said reference voltage corresponding to the threshold values $S_{a11}$, $S_{b11}$ and $S_{c11}$. Thus, three threshold values can be formed as those shown by the solid line 140 in FIG. 18.

Reference voltage setting devices 77 and 78 respectively output two levels of reference voltage to switch circuits 73, 74 and 75, the two levels of reference voltage respectively corresponding to $S_{a12}$, $S_{b12}$, $S_{c12}$ and $S_{a13}$, $S_{b13}$, $S_{c13}$. The switch circuits 73, 74 and 75 are arranged such as to output to comparators 70, 71 and 72 either one of the two kinds of threshold values in response to a threshold value exchange command output from the ROM 66. Thus, it is possible to form six kinds of threshold valuee such as those shown by one-dot chain lines in FIG. 18. However, among these threshold values, only three threshold values can be set at the same time.

The comparators 67, 68 and 69 make a comparison between the current deviations of the three phases and the fixed threshold values $S_{a11}$, $S_{b11}$ and $S_{c11}$, respectively, and output the results of the comparison to the latch circuit 63. The comparators 70, 71 and 72 make comparison between the current deviations of the three phases and the exchangeable threshold values $S_{a12}$, $S_{b12}$, $S_{c12}$ or $S_{a13}$, $S_{b13}$, $S_{c13}$, and output the results of comparison to the latch circuit 63. The ROM 66 includes the functions of the current deviation change direction detecting circuit 22, the switching mode judging circuit 27, the switching mode setting circuit 28 and the voltage vector selecting circuit 24, which are shown in FIG. 3.

The arrangement of the ROM 66 will be explained below. The ROM 66 is adapted to store optimal voltage vectors in correspondence with addresses, respectively, the voltage vectors being selected on the basis of various input data, i.e., a present voltage vector $V_k$, a past quantized current deviation $R_j^*$ and a switching mode data in addition to a quantized current deviation $R_j$ and a quasi-target voltage phase angle $\theta$, and in accordance with, basically, the aforementioned processing procedure according to the third form of the present invention. Every possible combination of the above-described input data is defined as an address.

Figure 31:
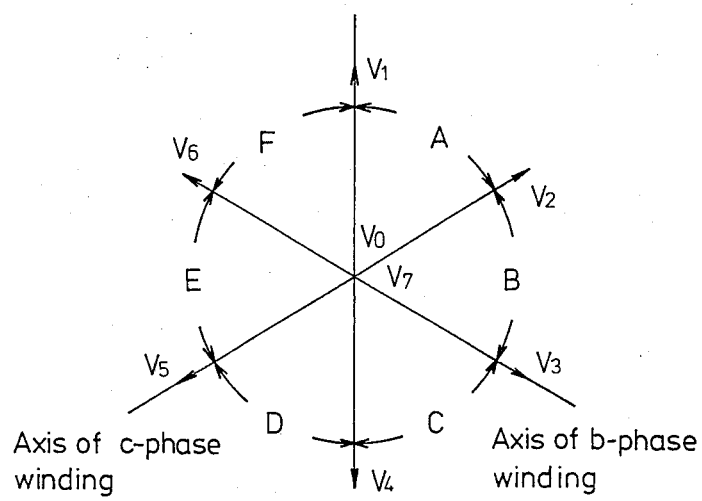
FIG. 31 shows a switching mode map.
Figure 32:
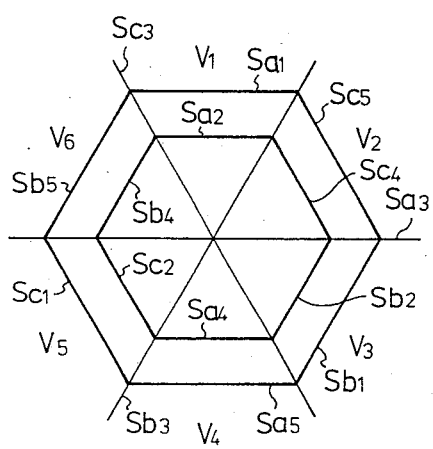
FIGS. 32 and 33 respectively show maps of voltage vectors which are allowed to be selected, the voltage vectors being set in correspondence with quantized current deviations, respectively.
Figure 33:
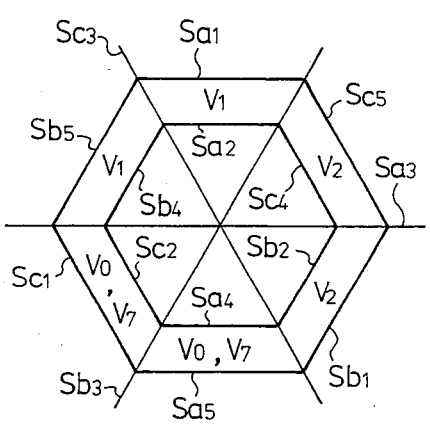
Figure 34:
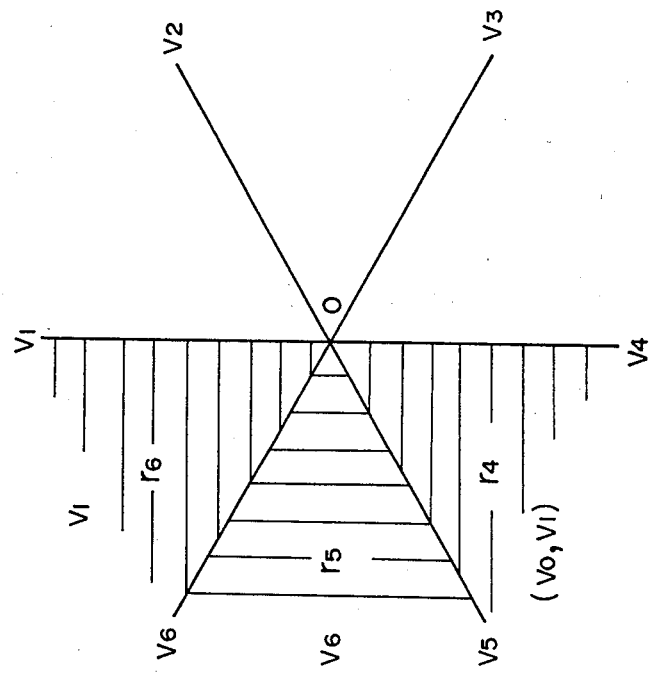
FIG. 34 shows directions in which current deviations change when the mode A is erroneously recognized for the mode F.

More specifically, the switching modes A to F and voltage vectors which are allowed to be selected in each switching mode are set according to the rules shown in FIG. 31 and Table 2 in the same way as that in the first embodiment. In addition, switching modes which are allowed to be selected for each quasi-target voltage phase angle $\theta$ are specified as shown in Table 4 and FIG. 20.

TABLE 4

| Quasi-target voltage phase angle $\theta$ | Switching modes which are allowed to be set | |
|---|---|---|
| $\theta_1$ ($-30° < \theta \leq 30°$) | A. | F. |
| $\theta_2$ ($30° < \theta \leq 90°$) | A. | B. |
| $\theta_3$ ($90° < \theta \leq 150°$) | B. | C. |
| $\theta_4$ ($150° < \theta \leq 210°$) | C. | D. |
| $\theta_5$ ($210° < \theta \leq 270°$) | D. | E. |
| $\theta_6$ ($270° < \theta \leq 330°$) | E. | F. |

It should be noted that, since the dividing lines 230 in accordance with the quasi-target voltage phase angles and the dividing lines 131 in accordance with the switching modes are offset from each other by 30°, this limitation of the switching modes is effective unless a particular quasi-target voltage phase angle involves an error which exceeds ±30°.

Figure 20:
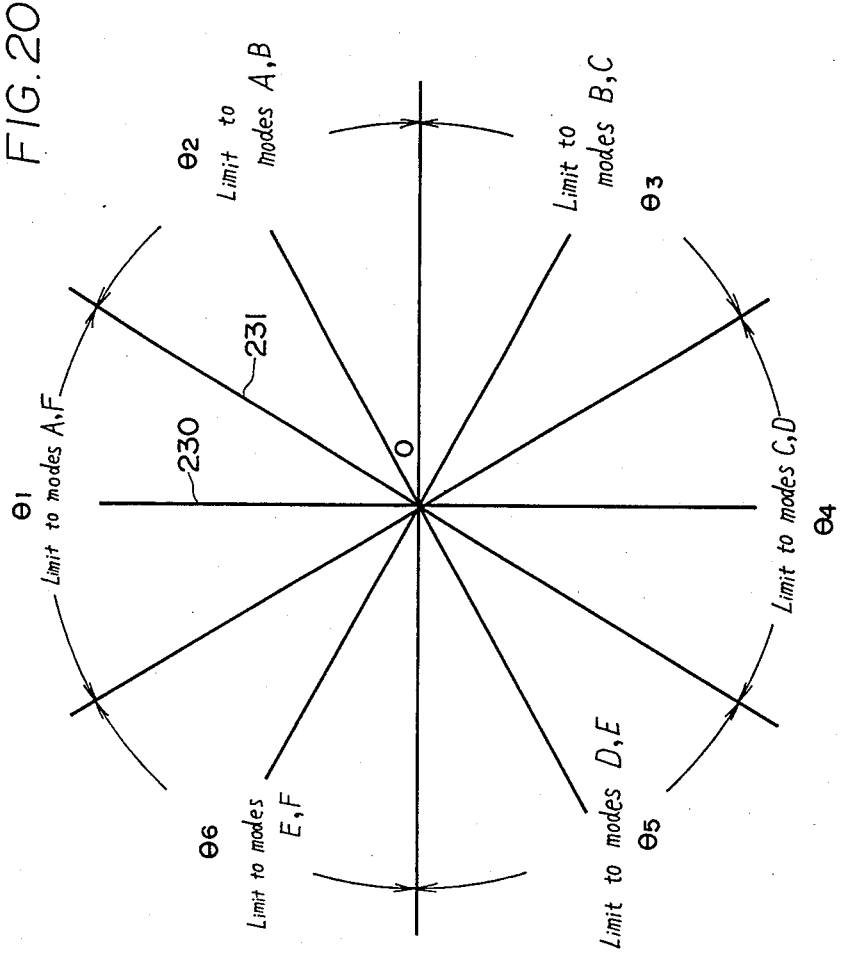
FIG. 20 shows a map employed to limit switching modes in accordance with quasi-target voltage phase angles.

More specifically, as will be understood from comparison between FIGS. 20 and 31, the section within which the mode A is allowed to be selected in the map shown in FIG. 20 is ±30° wider than that in the map shown in FIG. 31. Accordingly, any error within the range of ±30° is allowed.

Figure 19:
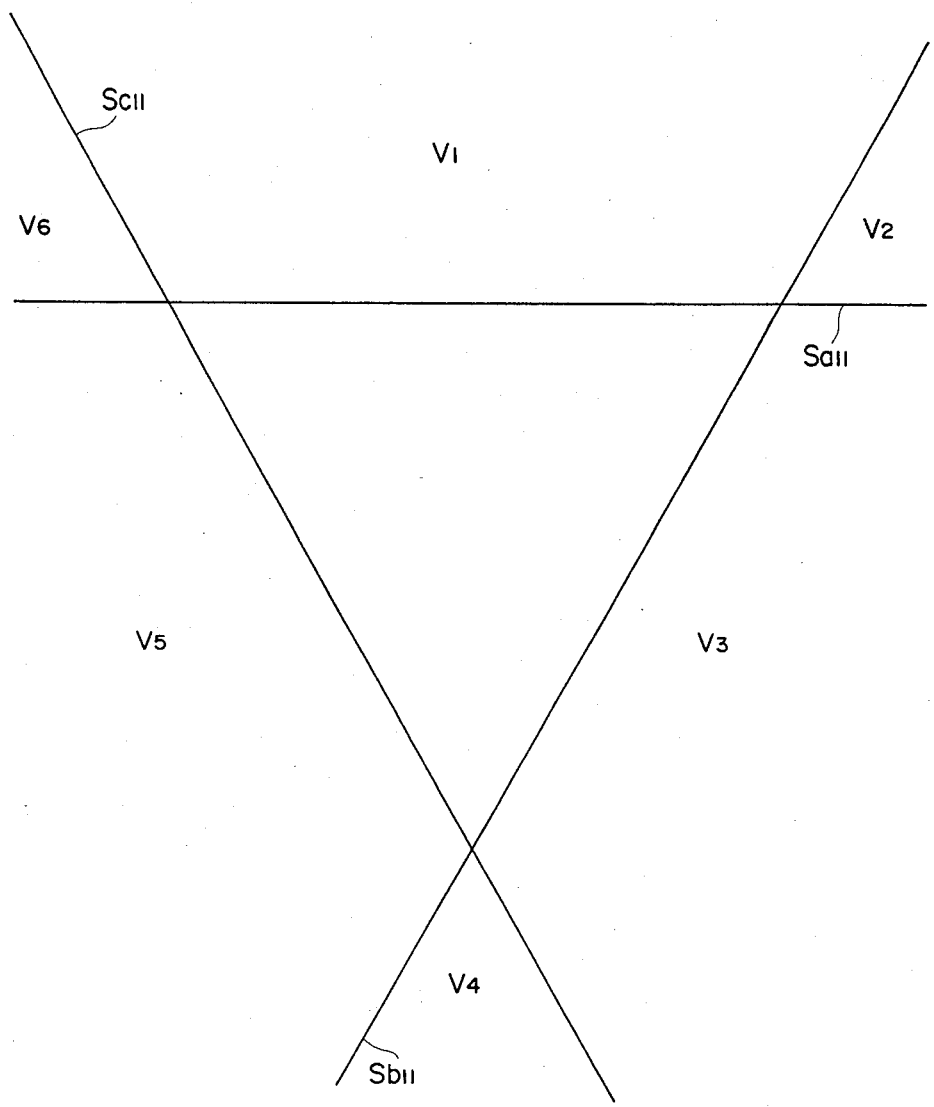
FIG. 19 shows a map of voltage vectors which are allowed to be selected, the voltage vectors being set in correspondence with quantized current deviations, respectively.

When the quantized current deviation $R_j$ is present in a quantizing region $R_j$ in which the absolute value of the maximum threshold value for any one of the phases is exceeded as shown in FIG. 19, a voltage vector $V_k$ set in correspondence with the quantizing region $R_j$ is unconditionally selected and output as a voltage vector command. For such a quantizing region $R_j$, a voltage vector $V_k$ which is suitable for decreasing the current deviation most quickly is selected and set in advance. It should be noted that, when the current deviation is present on a boundary between two adjacent quantizing regions, there is a fear of the selection of a voltage vector oscillating between two different voltage vectors. In order to eliminate such fear, when voltage vectors are changed, a voltage vector change inhibiting command is input to the monostable multivibrator 61 to inhibit voltage vectors from being changed from one to another for a predetermined period of time.

When the quantized current deviation $R_j$ is present inside the triangle shown by the thick line in FIG. 18, a switching mode and a voltage vector are selected in accordance with the divisions $\theta_1$ to $\theta_6$ defined by the quasi-target voltage phase angles $\theta$, a present switching mode, a present voltage vector and a quantized current deviation $R_j$. At the same time as the selection of a voltage vector, the two groups of threshold values $S_{a12}$, $S_{b12}$, $S_{c12}$ and $S_{a13}$, $S_{b13}$, $S_{c13}$, which are shown by the one-dot chain lines in FIG. 18, are exchanged for each other. The selection of a switching mode and a voltage vector is executed on the basis of the maps shown in FIGS. 21 to 27. The threshold values are set on each occasion as exemplarily shown in Table 5 and FIGS. 21 to 27.

It should be noted that, when a present voltage vector $V_k$ is to be changed for another, a present quantized current deviation $R_j$ is used as a past quantized current deviation $R_j^*$, whereas, when a present voltage vector $V_k$ need not be changed, a past quantized current deviation $R_j^*$ which has been sampled and held in the latch circuit 79 is used as a past quantized current deviation $R_j^*$. Thus, it is possible to recognize the starting point of the locus of changes in the current deviation $R_j$ at all times.

TABLE 5

Figure 21:
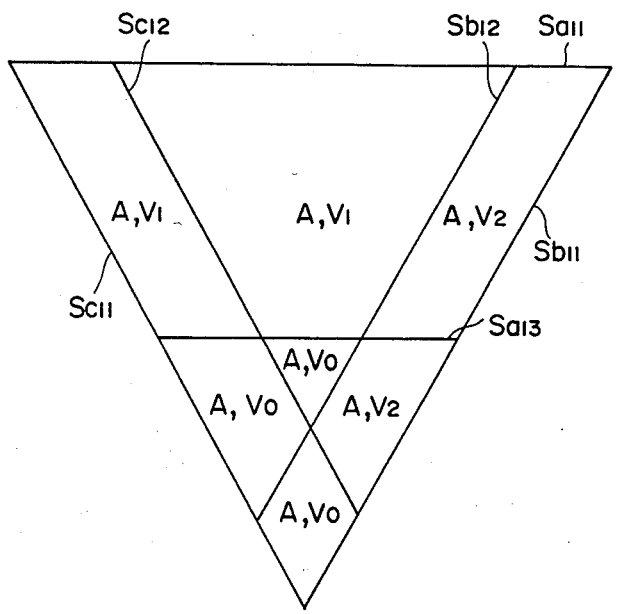
FIG. 21 shows a map of a switching mode and voltage vectors.
Figure 22:
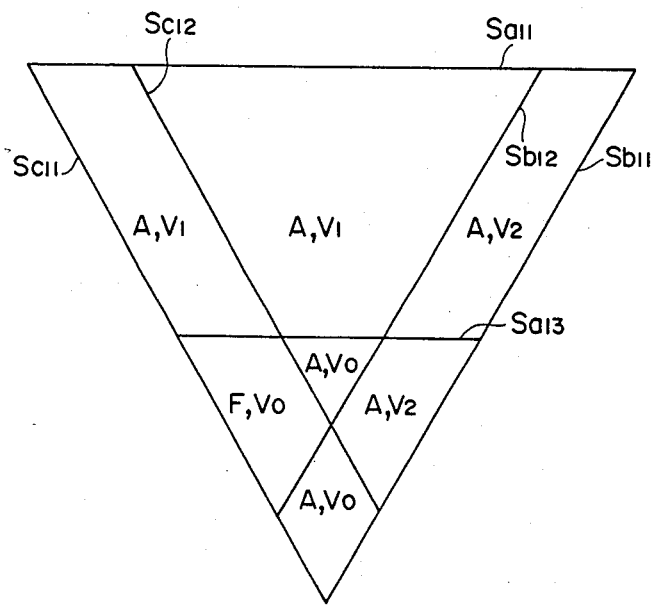
FIG. 22 shows a map of a switching mode and voltage vectors.
Figure 23:
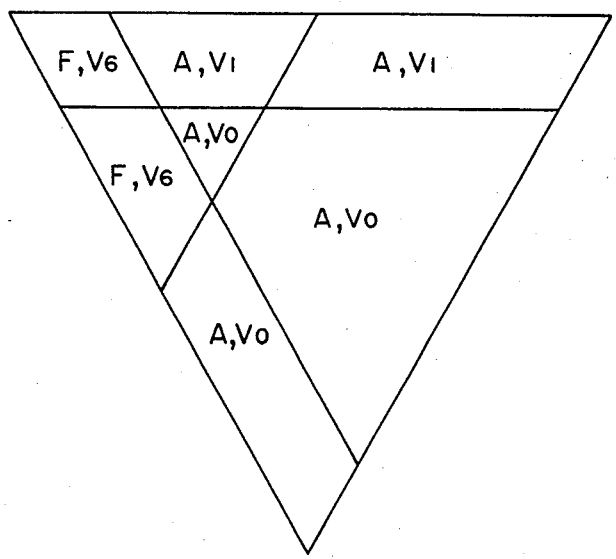
FIG. 23 shows a map of a switching mode and voltage vectors.
Figure 24:
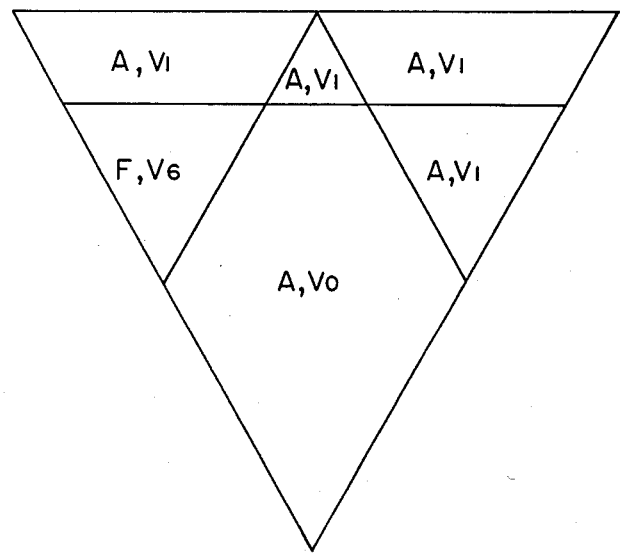
FIG. 24 shows a map of a switching mode and votlage vectors.
Figure 25:
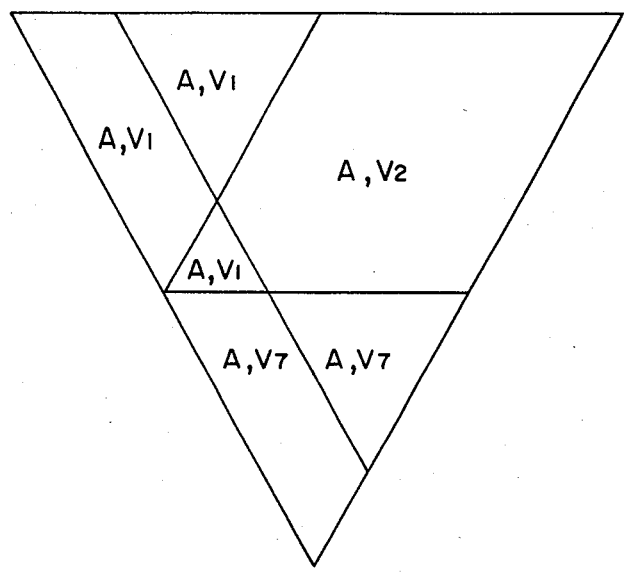
FIG. 25 shows a map of a switching mode and voltage vectors.
Figure 26:
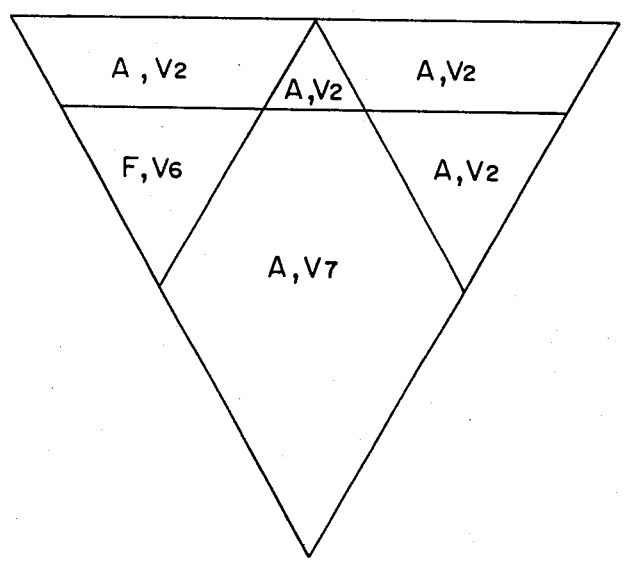
FIG. 26 shows a map of a switching mode and voltage vectors.
Figure 27:
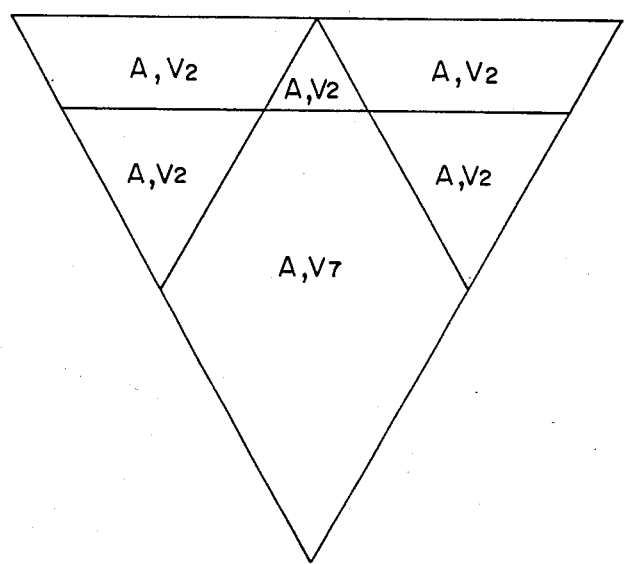
FIG. 27 shows a map of a switching mode and voltage vectors.

| Maps | Division $\theta_1$–$\theta_6$ by quasi-target voltage phase angles | Switching modes | Voltage vectors $V_k$ | Past quantized current deviation $R_j^*$ |
|---|---|---|---|---|
| FIG. 21 | $\theta_1$ | A | $V_1$ | 109, 110, 111, 112, 115 |
| FIG. 22 | $\theta_1$ | A | $V_1$ | 101, 102, 103, 104, 113 |
| FIG. 23 | $\theta_1$ | A | $V_0$ | 108 |
| FIG. 24 | $\theta_1$ | A | $V_0$ | 107, 114 |
| FIG. 25 | $\theta_1$ | A | $V_2$ | 104, 105, 106, 113 |
| FIG. 26 | $\theta_1$ | A | $V_7$ | 106, 107 |
| FIG. 27 | $\theta_1$ | A | $V_7$ | 108, 114 |

As has been described in relation to the first embodiment, if an appropriate switching mode is set, the current deviation change direction must converge within a predetermined range, that is, a range of reference direction of change, which is determined by a presently set switching mode A to F and a presently selected voltage vector $V_k$. The reference directions of change are shown in Table 3 and in FIGS. 8 to 13 in which they are represented by shadowed areas and in which the starting point of the current deviation is shifted to the origin O of the complex plane.

Thus, a present quantized current deviation $R_j$ and a past quantized current deviation $R_j^*$ are compared with each other to detect a current deviation change direction, and it is judged whether the presently set switching mode is appropriate or not in accordance with the result of a judgement as to whether or not the detected current deviation change direction is within the corresponding reference change direction range.

For example, when the conditions in which the map shown in FIG. 24 applies are met and it is found from Table 5 and FIG. 18 that the past quantized current deviation $R_j^*$ is 107 and the present quantized current deviation $R_j$ is 111, it is known from Table 3 and FIGS. 8 to 13 that the switching mode must be changed to the mode F. Therefore, the switching mode command is changed from the mode A to the mode F.

Figure 8:
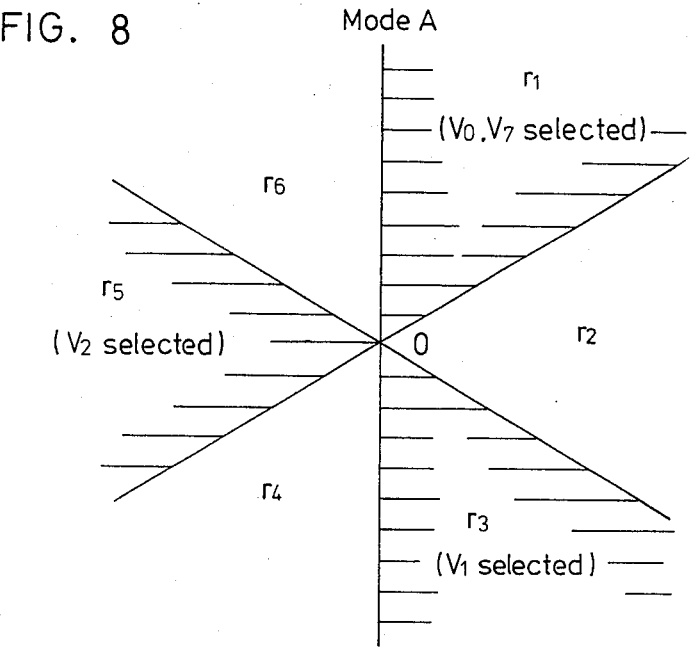
FIG. 8 shows reference directions of change when the switching mode is A.
Figure 9:
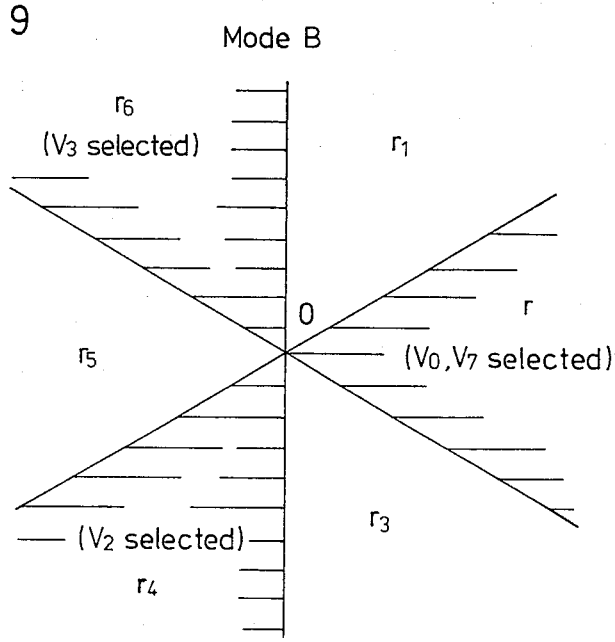
FIG. 9 shows reference directions of change when the switching mode is B.
Figure 10:
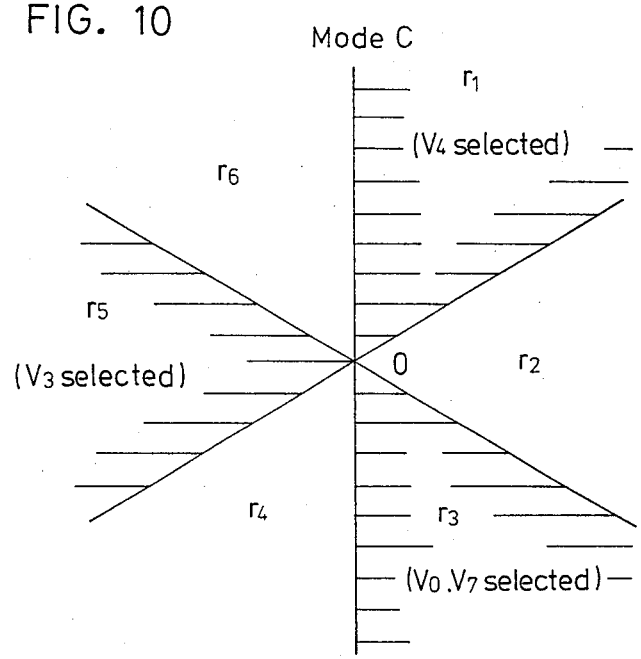
FIG. 10 shows reference directions of change when the switching mode is C.
Figure 11:
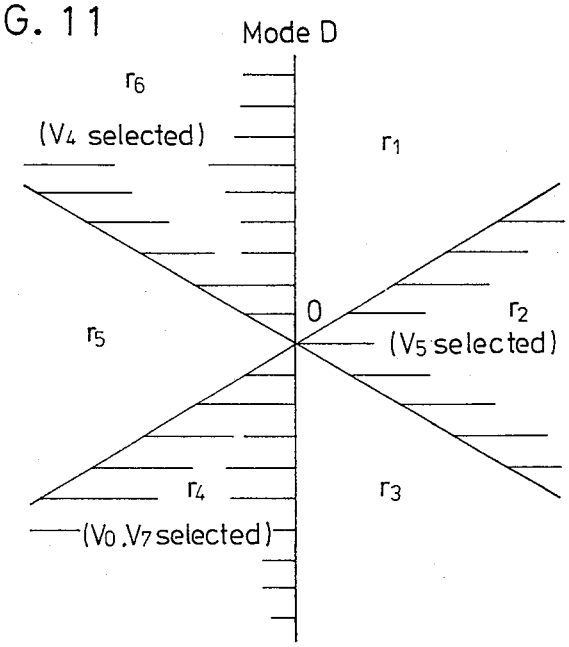
FIG. 11 shows reference directions of change when the switching mode is D.
Figure 12:
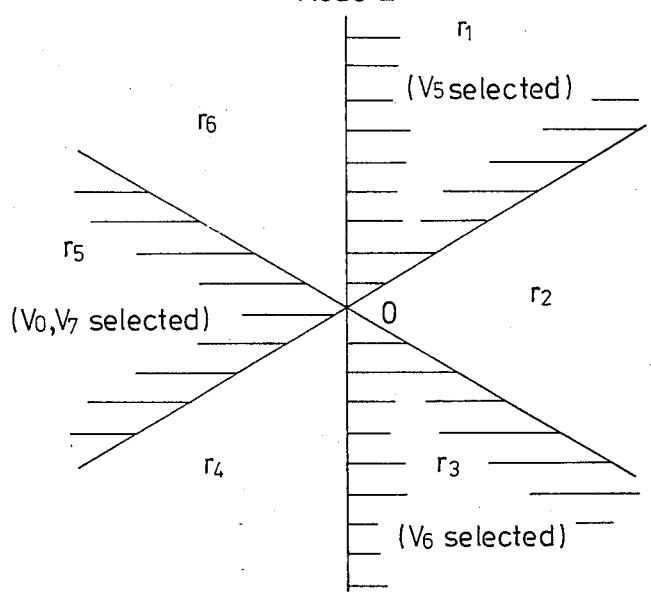
FIG. 12 shows reference directions of change when the switching mode is E.

On the other hand, when the conditions in which the map shown in FIG. 23 applies are met and it is found that the past quantized current deviation $R_j^*$ is 108 and the present quantized current deviation $R_j$ is 111, the current deviation change direction can enter either the reference change direction range shown in FIG. 8 or the reference change direction range shown in FIG. 13. In such case, therefore, te switching mode command is allowed to remain in the mode A.

The above-described processing is executed on the basis of data written in the ROM 66.

More specifically, as described above, a present switching mode, a present voltage vector $V_k$, a past quantized current deviation $R_j^*$, a present quantized current deviation $R_j$ and a quasi-target voltage phase angle $\theta$ are input to the address side of the ROM 66 in such a manner that the address bits are allotted among these data items. Therefore, a switching mode command corresponding to every possible combination of the above-described input data is written in advance into output bits of the ROM 66 which are allotted to the switching mode as a function of each address.

For example, a command for the mode F to be set is written in advance at an address which corresponds to a state of input data which represents the fact that the switching mode should be changed from the mode A to the mode F. Similarly, a command for the mode A to be set is written in advance at an address which corresponds to a state of input data which represents the fact that the switching mode should remain in the mode A.

Thus, when a present switching mode, a present voltage vector $V_k$, a past quantized current deviation $R_j^*$, a present quantized current deviation $R_j$ and a quasi-target voltage phase angle $\theta$ are input to the address side of the ROM 66, an appropriate switching mode command is instantaneously read out from the ROM 66.

It should be noted that maps such as that shown in FIG. 21 to 27 are prepared as functions with respect to all the quasi-target voltage phase angles $\theta$, all the switching modes A to F, all the voltage vectors $V_k$, all possible past quantized current deviations $R_j^*$ and all possible present quantized current deviations $R_j$, and stored in the ROM 66 in advance so that a judgement such as that described above is made at all times during the control process.

The selection of a voltage vector $V_k$ is effected in the following manner. Namely, one voltage vector which enables the current deviation to be decreased most effectively and involves the smallest number of times of switching is selected from among voltage vectors which are allowed to be selected in a switching mode which is presently set. Accordingly, in a manner similar to that in the case of the switching mode, maps such as those shown in FIGS. 21 to 27 are prepared as functions with respect to all the quasi-target voltage phase angles $\theta$, all the switching modes A to F, all the voltage vectors $V_k$, all possible past quantized current deviations $R_j^*$ and all possible present quantized current deviations $R_j$, and stored in the ROM 66 in advance so that an optimal voltage vector $V_k$ is selected at all times during the control process.

By virtue of the above-described arrangement, the current deviations $\Delta i_a$, $\Delta i_b$ and $\Delta i_c$ of the three phases which are respectively output from the adders 29, 30 and 31 are quantized in the current deviation quantizing circuit 59, and the quantized current deviation $R_j$ is latched by the latch circuit 63 for each control period so as to be stored therein. When the quantized current deviation $R_j$ is input to the ROM 66 from the latch circuit 63, a voltage vector $V_k$ which is to be selected and has been stored at an address is read and output, the address being determined by a past quantized current deviation $R_j^*$ input to the ROM 66 from the latch circuit 79, a present voltage vector $V_k$ input thereto from the latch circuit 62, a present switching mode input thereto from the latch circuit 65 and the quasi-target voltage phase angle $\theta$ input thereto from the latch circuit 64. In other words, the contents of the ROM 66 are prepared in advance in accordance with the above-described processing procedure, so that an optimal voltage vector is selected and output simply by inputting a quantized current deviation $R_j$ and a quasi-target voltage phase angle $\theta$ to the ROM 66.

As described above, according to the second embodiment of the present invention, it is judged whether a presently set switching mode is optimal or not on the basis of a quasi-target voltage phase angle $\theta$ and the current deviation change direction so as to set an optimal switching mode, and one voltage vector which enables the current deviation to be decreased most efficiently is selected from among voltage vectors set in correspondence with the set switching mode. Therefore, the control process involves an extremely small delay in response, so that it is possible to effect a current control which enables an optimal voltage vector alone to be selected at all times even during a transient state or even when the load impedance changes momentarily. In consequence, it becomes possible to reduce the switching frequency, losses, noise level, etc. in relation to the inverter and also increase the degree of accuracy in current control. In addition, stability and reliability against disturbance or other external noise are enhanced advantageously.

Further, in the second embodiment, switching modes which are allowed to be set are limited on the basis of the quasi-target voltage phase angles $\theta$ which are set in such a manner that errors within the range of $+30°$ are allowed. Since whether a presently set switching mode is appropriate or not is judged in accordance with the quasi-target voltage phase angles $\theta$, the processing method carried out to determine a switching mode is simplified, so that the size of the current control circuit can be made smaller than that in accordance with the first embodiment.

In addition, the processing time required to determine a switching mode is less than that in the case of the first embodiment, and the stability and reliability are also improved even more greatly.

In the second embodiment, the detection of a current deviation change direction, the judgement and setting of a switching mode, the selection of a voltage vector, and the setting of threshold values are carried out by the ROM 66 alone. In addition, the setting of threshold values is allowed to be variable, and the number of threshold values is reduced to six in total. Accordingly, the size of the current control circuit is further reduced, and this is advantageous from the economic point of view.

When the current deviation is relatively large, a voltage vector which enables the current deviation to be decreased most quickly is selected unconditionally as shown in FIG. 19, which means that the response is improved greatly.

Further, a voltage vector exchange inhibiting command is output to the monostable multivibrator 61 to prevent two voltage vectors from being frequently exchanged for each other on a boundary shown in FIG. 19. On the other hand, the conventional method shown in FIG. 32 inevitably involves oscillation which occurs on a boundary between two adjacent regions.

In the second embodiment, a voltage vector to be selected is determined on the basis of a selected switching mode, a present voltage vector and a quantized current deviation. For this reason, the order according to which voltage vectors are selected can be specified in detail, and it is possible to change all the voltage vectors by effecting commutation for only one phase. Accordingly, the switching frequency of the inverter can be lowered, and hence it is possible to reduce the switching loss and lower the noise level. Since in this embodiment the present voltage vector is fed back, threshold values are exchanged in accordance with each voltage vector. Accordingly, the number of threshold values can be reduced to six in total, and it is possible to reduce the size of the current control circuit.

In the conventional method, no present voltage vector is fed back, and therefore the order according to which voltage vectors are selected may become irregular, so that two phases may simultaneously be subjected to commutation when voltage vectors are changed, which undesirably leads to an increase in the switching frequency. Further, it is impossible, with the conventional method, to change threshold values in accordance with each selected voltage vector, and a total of 15 threshold values are needed, which complicates the arrangement of the current control circuit.

Although in the above-described first and second embodiments the method according to the present invention is carried out by a logic circuit, the present invention may also be realized by an analog circuit or software executed by a microcomputer or the like.

Although in the first and second embodiments, six kinds of switching modes are exemplarily set, the method of the present invention can be realized for other switching modes.

Similarly, the method of quantizing current deviations, the method of detecting a current deviation change direction and the method of selecting a voltage vector, which are shown in the above-described embodiments, are not necessarily limitative, and other methods may be employed to realize the present invention.

In addition, although the load in the above-described embodiments is a three-phase load, this is not necessarily limitative, and the method of the present invention may similarly be applied to other polyphase loads.

What is claimed is:

1. A method of controlling current of a multi-phase inverter in which switching elements of said multi-phase inverter are ON/OFF controlled so that instantaneous values of output currents of said multi-phase inverter are coincident with output current command values, respectively, said method comprising the steps of:

(a) defining a plurality of voltage vectors in accordance with the magntiude and direction of an output voltage of said multi-phase inverter on a complex plane wherein an axis corresponding to each phase in said multi-phase inverter is set based on a phase angle of said each phase, said output voltage being determined in accordance with a magnitude of a DC power supply source in said multi-phase inverter and a combination of ON/OFF states of the switching elements;

(b) defining a plurality of voltage vector groups each comprising a plurality of voltage vectors including at least one voltage vector of magnitude zero, the directions of which are within 180° with respect to each other, and setting switching modes in correspondence with said voltage vector groups, respectively, each switching mode allowing selection of the voltage vectors within the corresponding group when it is set;

(c) obtaining current deviations of detected output current values from their respective output current command values, and detecting a direction of change of the position of the end of the current deviation vector on a complex plane;

(d) making a judgement as to whether or not said detected direction of change belongs to a reference change direction range which is determined by both a presently output voltage vector and one of said switching modes which is presently set;

(e) maintaining said presently set switching mode when the answer of the judement is affirmative, but changing said presently set switching mode to a switch mode involving a reference change direction range to which said detected change direction belongs and which is determined by the presently selected voltage vector when the answer of the judgement is negative; and (f) selecting a voltage vector from the voltage vectors which are allowed to be selected in the switching mode which is maintained or newly set, said voltage vector being capable of converging said current deviations within a predetermined range including the origin on said complex plane.

2. A method according to claim 1, wherein in said step (d) a switching mode judging circuit is supplied with a detected current deviation change direction from a current deviation change direction detecting circuit, a presently set switching mode from a switching mode setting circuit, and a presently selected voltage vector from a voltage vector selecting circuit, and in said step (e) said switching mode setting circuit is adapted to select one switching mode from a group of switching modes determined as initial modes in advance and set the selected mode as a present switching mode, and thereafter, said switching mode setting circuit resets a switching mode at any time when it receives a switching mode change signal which is output from said switching mode judging circuit.

3. A method according to claim 1, wherein the setting of switching modes is effected by: detecting a quasi-target voltage phase angle which is approximated to a target voltage phase angle; selecting switching modes which may be a presently optimal switching mode when the detected quasi-target voltage phase angle is supposed to include an error within an allowable range; and selecting, when a presently set switching mode is to be changed, a switching mode from among said selected switching modes which is coincident with a reference change direction range to which said detected change direction belongs and that is determined by a presently outout voltage vector.

4. A method according to claim 1, wherein the detection of a direction of change of the position of the end of the current deviation vector is effected by: setting a quantizing map which has a plurality of quantizing regions defined on a complex plane by a plurality of threshold values set for output currents of the various phases; making comparison between current deviations of the various phases and the corresponding threshold values to obtain a quantizing region on said quantizing map to which the current deviations of all the phases belong mutually; and detecting a direction which intersects both the obtained quantizing region and a quantizing region obtained during a previous control period as a direction of change of the position of the end of the current deviation vector.

5. A method according to claim 1, wherein in said step (a) eight voltage vectors which are determined in accordance with the combination of ON/OFF states of switching elements for three phases are divided into six voltage vector groups each including two voltage vectors which are adjacent to each other at a phase angle of 60° and the starting points of which are coincident with the origin on a complex plane and two voltage vectors of magnitude zero which are located at the origin on the complex plane, and switching modes are set in correspondence with said voltage vector groups, respectively, each switching mode allowing selection of the four voltage vectors within the corresponding group when it is set.

6. A method according to claim 1, wherein in said step (d), when the starting point of the direction of change of a current deviation which is defined by the difference between a target voltage value and a presently selected voltage vector in a presently set switching mode is shifted to the origin on the complex plane, a range to which the end point of said current deviation change direction belongs is defined as a reference change direction range.

7. A method according to claim 3, wherein the setting of a switching mode is effected by: detecting a quasi-target voltage phase angle which is approximated to a target voltage phase angle and which is supposed to include an error within the range of +/−30 degrees with respect to a target voltage phase angle; selecting two switching modes which may be a presently optimal switching mode in which the voltage vector being closest to said quasi-target voltage are allowed to be selected; and selecting, when a presently set switching mode is to be changed, a switching mode from among said selected switching modes which is coincident with a reference change direction range to which said detected change direction belongs and that is determined by a presently output voltage vector.

8. A method according to claim 4, wherein the detection of a direction of change of the position of the end of the current deviation vector is effected by: setting a group of four threshold values for each of the three phases, each group including two maximum threshold values and two minimum threshold values; setting a quantizing map which has a plurality of quantizing regions defined on a complex plane by these threshold values; defining a quantizing region to which current deviations of detected output current values from their respective command values of the three phases belong mutually as a quantized current deviation; and effecting detection such that, when said quantized current deviation is present within a region between a hexagon defined by the maximum threshold values in the threshold value groups for said phases and a hexagon defined by the minimum threshold values in the threshold value groups for said phases, a direction which intersects a region to which a past quantized current deviation belongs and a region to which the present quantized current deviation belongs is detected as a direction of change of the position of the end of the current deviation vector.

9. A method according to claim 4, wherein the detection of a direction of change of the position of the end of the current deviation vector is effected by: setting a group of three threshold values for each of the three phases, each group including one fixed maximum threshold value and two exchangeable threshold values smaller than said maximum threshold value; setting a quantizing map which has a plurality of quantizing regions defined on a complex plane by said threshold values; defining a quantizing region to which current deviations of detected output current values from their respective command values of the three phases belong mutually as a quantized current deviation; exchanging, when said quantized current deviation is present within a region inside a triangle surrounded by the maximum threshold values in the threshold value groups for said phases, said exchangeable threshold values for the other exchangeable threshold values inside said triangle in accordance with a presently selected voltage vector, a presently set switching mode, and the past conditions of the current deviations; and detecting a direction which intersects a region to which a past quantized current deviation belongs and a region to which the present quantized current deviation belongs as a direction of change of the position of the end of the current deviation vector.

10. A method according to claim 1, wherein in the selection of a voltage vector which is capable of converging said current deviations within a predetermined range including the origin on said complex plane in said step (f), when said current deviations are going out of said predetermined range, a voltage vector is selected from among a group of voltage vectors which are allowed to be selected in a presently set switching mode, said voltage vector enabling the direction of the central line of a reference change direction range, which is determined by both said voltage vector and the presently set switching mode, to be closest to a direction exactly opposite to the current deviation vector.

11. A method according to claim 1, wherein in the selection of a voltage vector which is capable of converging said current deviations within a predetermined range including the origin on said complex plane in said step (f), when said current deviations are going out of said predetermined range, a voltage vector is selected from among a group of voltage vectors which are allowed to be selected in a presently set switching mode and to which a presently set voltage vector can be changed by effecting commutation for only one phase, said voltage vector enabling the direction of the central line of a reference change direction range, which is determined by both said voltage vector and the presently set switching mode, to be closest to a direction exactly opposite to the current deviation vector.

12. A method according to claim 1, wherein in the selection of a voltage vector which is capable of converging said current deviations within a predetermined range including the origin on said complex plane in said step (f), when the current deviations are completely out of said predetermined range, the outside of said range is divided into two kinds of regions including first regions the centers of which are respectively defined by the prolongations of various voltage vectors, and second regions each defined between the prolongations of each pair of adjacent voltage vectors and other than said first regions, whereby, when the current deviations are present in said first region, the voltage vector which is present on the central line of this region is unconditionally selected, whereas, when the current deviations are present in said second region, either one of the adjacent voltage vectors which involves a smaller number of phases that need commutation is selected.

13. A method according to claim 1, wherein in the selection of a voltage vector which is capable of converging said current deviations within a predetermined range including the origin on said complex plane in said step (f), when the current deviations are completely out of said predetermined range, the outside of said range is divided into regions the center of which are respectively defined by the prolongations of various voltage vectors, whereby, when the current deviations are present in one of said regions, the voltage vector which is present on the central line of this region is unconditionally selected, whereas, when the current deviations have moved to a region the center of which is defined by the prolongation of another voltage vector, a presently set voltage vector is changed to the voltage vector which is present on the central line of that region when a predetermined period of time has elapsed after the current deviations have moved to said region.

14. A method according to claim 1, wherein in the selection of a voltage vector which is capable of converging said current deviations within a predetermined range including the origin on said complex plane in said step (f), when a point of time when the current deviations are going out of said predetermined range is judged in order to determine a point of time when voltage vectors are to be changed from one to another, a plurality of kinds of said predetermined range are prepared, and said plurality of predetermined ranges and current deviations are compared with each other to recognize a plurality of points of time for changing voltage vectors, and the points of time for changing voltage vectors are changed in accordance with a presently set switching mode, a presently selected voltage vector and the past conditions of the current deviations.

15. A method according to claim 1, wherein in the selection of a voltage vector which is capable of converging said current deviations within a predetermined range including the origin on said complex plane in said step (f), when a point of time when the current deviations are going out of said predetermined range is judged in order to determine a point of time when voltage vectors are to be changed from one to another, said predetermined range is changed in accordance with a presently set switching mode, a presently selected voltage vector and the past conditions of the current deviations, thereby changing the points of time for changing voltage vectors.

16. A method according to claim 3, wherein said quasi-target voltage phase angle is obtained in such a manner that the output voltage of said multi-phase inverter is directly detected and passed through a low-pass filter to extract the fundamental wave, and the phase angle thereof is obtained.

17. A method according to claim 3, wherein, when the impedance of a load is known in some measure, said quasi-target voltage phase angle is obtained by detecting the phase difference between voltage and current and adding this phase difference to the phase angle of a current command value.

18. A method according to claim 3, wherein, when an AC motor is vector-controlled, said quasi-target voltage phase angle is obtained by utilizing the phase of voltage which is recognized in a vector control circuit.

19. A method of controlling current of a multi-phase inverter in which switching elements of said multi-phase inverter are ON/OFF controlled so that instantaneous values of output currents of said multi-phase inverter are coincident with output current command values, respectively, said method comprising the steps of:

(a) dividing eight voltage vectors which are determined in accordance with the combination of ON/OFF states of the switching elements for three phases into six voltage vector groups each including two voltage vectors which are adjacent to each other at a phase angle of 60° and the starting points of which are coincident with the origin on a complex plane and two voltage vectors of magnitude zero which are located at the origin on the complex plane, and setting switching modes in correspondence with said voltage vector groups, respectively, each switching mode allowing selection of the four voltage vectors within the corresponding group when it is set;

(b) defining a reference change direction range in such a manner that the starting point of the direction of change of a current deviation, which is defined by the difference between a target voltage and a presently selected voltage vector in a presently set switching mode, is shifted to the origin on the complex plane, and a range to which the end point of said current deviation change direction belongs is defined as a reference change direction range, and setting a group of four threshold values which includes two maximum threshold values and two minimum threshold values for each of the three phases to define a plurality of quantizing regions on a complex plane by these threshold values, and defining a quantizing region to which current deviations of detected output current values from their respective command values of the three phases belong mutually as a quantized current deviation;

(c) effecting selection of a voltage vector in such a manner that, in the case that said quantized current deviation is present outside a maximum hexagon defined by the maximum threshold values in the threshold value groups for said phases and the outside of said maximum hexagon is divided into two kinds of regions including first regions the centers of which are respectively defined by the prolongation of various voltage vectors and second regions each defined between the prolongations of each pair of adjacent voltage vectors and other than said first regions, whereby, when the current deviations are present in said first region, the voltage vector which is present on the central line of this region is unconditionally selected, whereas, when the current deviations are present in said second region, either one of the adjacent voltage vectors which involves a smaller number of phases that need commutation is selected; and (d) further effecting selection of a voltage vector in such a manner that, when said quantized current deviation is present inside a minimum hexagon, defined by the minimum threshold values in the threshold value groups for said phases, no change of voltage vectors is effected, whereas, when said quantized current deviation is present within a region between said maximum and minimum hexagons in the threshold voltage groups for said three phases, a direction which intersects a region to which a past quantized current deviation belongs is detected as a direction of change of the position of the end of the current deviation vector, when said detected change direction is coincident with said reference change direction range when the starting point of said detected change direction is shifted to the origin on said complex plane, a presently set switching mode is maintained, whereas, when said detected change direction is not coincident with said reference change direction range, said switching mode is changed to another switching mode which has the same reference change direction, and selecting a voltage vector which enables said quantized current deviation to be decreased effectively and which involves a smaller number of times of switchng in said switching mode which is maintained or newly set.

20. A method controlling current of a multi-phase inverter in which switching elements of said multi-phase inverter are ON/OFF controlled so that instantaneous values of output currents of said multi-phase inverter are coincident with output current command values, respectively, said method comprising the steps of:

(a) dividing eight voltage vectors which are determined in accordance with the combination of ON/-OFF states of the switching elements for three phase into six voltage vector groups each including two voltage vectors which are adjacent to each other at a phase angle of 60° and the starting points of which are coincident with the origin on a complex plane and two voltage vectors of magnitude zero which are located at the origin on the complex plane, and setting switching modes in correspondence with said voltage vector groups, respectively, each switching mode allowing selection of the four voltage vectors within the corresponding group when it is set;

(b) detecting a quasi-target voltage phase angle which is approximated to a target voltage phase angle and which includes an error within the range of +/−30 degrees with respect to a target voltage phase angle; selecting two switching modes which may be a presently optimal switching mode in which the voltage vector being closest to said quasi-target voltage are allowed to be selected;

(c) defining a reference change direction range in such a manner that the starting point of the direction of change of a current deviation, which is defined by the difference between a target voltage value and a presently selected voltage vector in a presently set switching mode, is shifted to the origin on the complex plane, and a range to which the end point of said current deviation change direction belongs is defined as a reference change direction range, and setting a group of three threshold values for each of the three phases, said group including one fixed maximum threshold value and two exchangeable threshold values smaller than said maximum threshold value, defining a quantizing map which has a plurality of quantizing regions defined on a complex plane by said threshold values, and defining a quantizing region to which current deviations of detected output current values from their respective command values of the three phases belong mutually as a quantized current deviation;

(d) unconditionally selecting one of the voltage vectors which are set in correspondence with the quantizing regions outside a triangle surrounded by said fixed maximum threshold values for said three phases, when said quantized current deviation is present in one of said quantizing regions outside said triangle;

(e) inhibiting the change of voltage vectors for a predetermined period of time after said quantized current deviation has passed a boundary between a pair of adjacent quantizing regions; and (f) exchanging said exchangeable threshold values inside said triangle in correspondence with a presently set voltage vector, a presently set switching mode, and the past conditions of the current deviations when said quantized current deviation is present inside said triangle, detecting a direction which intersects both a region to which a past quantized current deviation belongs and a region to which a present quantized current deviation belongs as a direction of change of the position of the end of the current deviation vector, changing switching modes in such a manner that, when said detected change direction is coincident with said reference change direction range when the starting point of said detected change direction is shifted to the origin on the complex plane, a presently set switching mode is maintained, whereas, when said detected change direction is not coincident with said reference change direction range, the switching mode is changed to another switching mode which has the same reference change direction range, and selecting a voltage vector which enables said quantized current deviation to be decreased effectively and which involves a smaller number of times of switching in said switching mode which is maintained or newly set.

* * * * *